United States Patent
Balkanyi et al.

(10) Patent No.: US 7,530,398 B2
(45) Date of Patent: May 12, 2009

(54) METHOD AND APPARATUS FOR A COLD FLOW SUBSEA HYDROCARBON PRODUCTION SYSTEM

(75) Inventors: Szabolcs Roland Balkanyi, Houston, TX (US); James George Broze, Houston, TX (US); Jose Oscar Esparza, Katy, TX (US); Gregory John Hatton, Houston, TX (US); Ajay Praful Mehta, Houston, TX (US); Chien Kuei Tsai, Katy, TX (US); Moye Wicks, III, Houston, TX (US); George John Zabaras, Houston, TX (US)

(73) Assignee: Shell Oil Company, Houston, TX (US)

( * ) Notice: Subject to any disclaimer, the term of this patent is extended or adjusted under 35 U.S.C. 154(b) by 550 days.

(21) Appl. No.: 11/303,254

(22) Filed: Dec. 16, 2005

(65) Prior Publication Data
US 2006/0175063 A1    Aug. 10, 2006

Related U.S. Application Data

(60) Provisional application No. 60/637,485, filed on Dec. 20, 2004.

(51) Int. Cl.
*E21B 7/12* (2006.01)
*E21B 29/12* (2006.01)

(52) U.S. Cl. .................. 166/344; 166/366; 165/95; 165/154; 210/737

(58) Field of Classification Search ............... 166/344, 166/366, 57, 311; 210/194, 737; 165/95, 165/154
See application file for complete search history.

(56) References Cited

U.S. PATENT DOCUMENTS

| | | | | |
|---|---|---|---|---|
| 3,063,080 A | * | 11/1962 | Bergman et al. | 15/104.062 |
| 3,556,218 A | * | 1/1971 | Talley et al. | 166/265 |
| 3,562,014 A | | 2/1971 | Childers et al. | |
| 3,590,919 A | * | 7/1971 | Talley, Jr. | 166/357 |
| 4,079,782 A | | 3/1978 | Soderberg et al. | 165/95 |
| 4,124,065 A | | 11/1978 | Leitner et al. | 165/95 |
| 4,283,807 A | | 8/1981 | Bizard | 15/3.51 |
| 4,328,098 A | * | 5/1982 | Benson | 210/195.1 |
| 4,350,202 A | | 9/1982 | Schulz et al. | 165/95 |
| 4,420,038 A | | 12/1983 | Okouchi et al. | 165/95 |
| 4,441,987 A | * | 4/1984 | Broadhurst | 208/33 |
| 4,502,787 A | * | 3/1985 | Broadhurst | 366/149 |
| 4,556,102 A | | 12/1985 | Bochinski et al. | 165/95 |

(Continued)

FOREIGN PATENT DOCUMENTS

EP    583913 A1    3/1993

OTHER PUBLICATIONS

T.K. Serghides, Estimate Friction Factor Accurately, Chem. Eng., Mar. 5, 2984, pp. 63-64.

(Continued)

*Primary Examiner*—Thomas A Beach
(74) *Attorney, Agent, or Firm*—William E. Hickman

(57) ABSTRACT

A system for assuring subsea hydrocarbon production flow in pipelines by chilling the hydrocarbon production flow in a heat exchanger and causing solids to form, periodically removing deposits and placing them in a slurry utilizing a closed loop pig launching and receiving systems.

23 Claims, 11 Drawing Sheets

U.S. PATENT DOCUMENTS

| | | | | |
|---|---|---|---|---|
| 4,566,533 | A | | 1/1986 | Bochinski et al. ............. 165/95 |
| 4,755,230 | A | * | 7/1988 | Ashton et al. ............ 134/22.14 |
| 5,020,561 | A | | 6/1991 | Li ................................ 137/13 |
| 5,254,366 | A | | 10/1993 | Lowther ..................... 427/238 |
| 5,284,581 | A | | 2/1994 | Benson ....................... 210/194 |
| 5,286,376 | A | | 2/1994 | Benson ....................... 210/194 |
| 5,427,680 | A | | 6/1995 | Benson ....................... 210/194 |
| 5,676,848 | A | | 10/1997 | Benson ....................... 210/794 |
| 5,801,824 | A | | 9/1998 | Henley ....................... 356/237 |
| 5,803,161 | A | * | 9/1998 | Wahle et al. ........... 165/104.21 |
| 5,842,816 | A | | 12/1998 | Cunningham ............... 405/170 |
| 5,888,407 | A | | 3/1999 | Benson ....................... 210/791 |
| 6,070,417 | A | | 6/2000 | Benson ......................... 62/71 |
| 6,079,452 | A | | 6/2000 | Touzel et al. ................ 138/149 |
| 6,079,498 | A | | 6/2000 | Lima et al. | |
| 6,145,547 | A | | 11/2000 | Villatte ....................... 138/149 |
| 6,278,095 | B1 | | 8/2001 | Bass et al. .................. 219/629 |
| 6,292,627 | B1 | | 9/2001 | Gilchrist, Jr. et al. ........ 392/311 |
| 6,336,238 | B1 | | 1/2002 | Tarlton ......................... 15/3.5 |
| 6,409,843 | B1 | | 6/2002 | Ellett ............................ 134/8 |
| 6,412,135 | B1 | | 7/2002 | Benson .................. 15/104.062 |
| 6,569,255 | B2 | | 5/2003 | Sivacoe .......................... 134/8 |
| 6,656,366 | B1 | | 12/2003 | Fung et al. .................. 210/737 |
| 6,772,840 | B2 | * | 8/2004 | Headworth ................. 166/302 |
| 2003/0056954 | A1 | | 3/2003 | Headworth | |
| 2008/0087328 | A1 | * | 4/2008 | Christensen et al. .......... 137/13 |

OTHER PUBLICATIONS

C. Bennet and J. Myers, Momentum, Heat and Mass Transfer, p. 389, McGraw Hill Book Co., New York, NY (1982).

W.H. Adams, Heat Transmission, $3^{rd}$ Ed., p. 260, McGraw-Hill, New York, New York (1954).

Bird, R., Stewart, W. and Lightfoot, E., Transport Phenomenon, at p. 389, John Wiley and Sons, New York, N.Y. (1960).

International Search Report dated Apr. 13, 2006, TH2726 PCT, PCT/US2005/045516, Dec. 16, 2005.

Written Opinion dated Apr. 13, 2006, TH2726 PCT, PCT/US2005/045516, Dec. 16, 2005.

* cited by examiner

METHOD AND APPARATUS FOR A COLD FLOW SUBSEA HYDROCARBON PRODUCTION SYSTEM

CROSS-REFERENCE TO RELATED APPLICATIONS

This application claims priority to U.S. Provisional Application 60/637,485, filed on Dec. 20, 2004. U.S. Provisional Application 60/637,485 is herein incorporated by reference in its entirety.

FIELD OF THE INVENTION

The present invention is directed to a subsea method and apparatus for treating a subsea production stream.

BACKGROUND OF THE INVENTION

Hydrocarbon production in a subsea environment is a capital intensive, time-consuming and challenging process. The cost of nearby deepwater offshore structures or hosts to support exploration and production has become increasingly prohibitive, particularly in deep water (in excess of 3000 feet). Producers have been forced to investigate the economic and technical feasibility of subsea production systems that are tied back to existing offshore structures that may be many miles away. While the production stream may leave the wellhead at an elevated temperature, it is rapidly chilled as it travels many miles in a deepwater environment, where temperatures may be on the order of 5° C.

A subsea production stream may be comprised of water or brine, gas, oil, together with dissolved solids such as waxes, asphaltenes, organic and inorganic salts. At high temperatures and pressures, the dissolved solids remain in solution. However, once the production stream leaves the wellhead, it begins to cool and the pressure is reduced when compared to wellhead pressure. These changes in temperature and pressure result in the dissolved solids precipitating and the creation of new solids. Inorganic salts may precipitate as scale on the pipeline; the dissolved asphaltenes and waxes will form solids that may adhere to the internal walls of the pipeline. Moreover, the gas and water may react to form solid hydrates that may likewise adhere to the walls of the pipeline. As the solids precipitate and solid hydrates form, they can, over time reduce the throughput of the pipeline and the production from the well. These mechanisms of precipitation of solids and creation of solid hydrates are well known in the art and have been the subject of study. The field of subsea production technology that deals with maintaining desired production flow is generally referred to as flow assurance.

Some efforts have been directed to determining whether the internal smoothness of the flow line or pipeline may be improved to prevent adherence of wax to pipeline walls. Similarly, coatings, either internally applied or flow applied, have been studied to determine if they can prevent solids from adhering to the pipeline walls. See, U.S. Pat. Nos. 5,254,366 and 5,020,561, which are herein incorporated by reference in their entirety. To date, there have been no successful field implementations of these techniques.

Other flow assurance means have been directed to modifying the pipeline environment itself. Insulated pipe such as U.S. Pat. No. 6,079,452 or pipe-in-pipe systems, such as U.S. Pat. No. 6,145,547 have become common. However, these systems only attempt to ameliorate the effects of subsea cold and operating pressure. Over large distances, even insulated pipe may not be effective in preventing deposition and pipeline clogging. A variation on the theme of attempting to control the pipeline environment is the use of electrically heated pipe or electrically heated pipe-in-pipe. See, U.S. Pat. Nos. 6,278,095 and 6,292,627. These systems can be effective but require significantly more expensive pipeline and heat support systems. For extremely long transport distances, the costs associated with these types of systems may be prohibitive.

Another means of flow assurance is the injection of chemicals that prevent blockage of the production stream. Common among these are thermodynamic inhibitors such as methanol and glycol. In this type of system, inhibitor is pumped through umbilical flow lines from the offshore structure to which the production stream is flowing to a point near the subsea production wellhead and injected into the production stream early in its transport. These types of systems require the laying and controlling of long length umbilical systems, as well as pumping means for pumping the inhibitor out to the injection point(s). If the inhibitor is separated from the production flow at the host, it must either be disposed of or recycled for continued flow assurance use. The equipment to support separation and recycling or disposal takes up offshore-structure deck space that might have otherwise been used for other production related activities. As such, chemical flow assurance, while effective, remains an expensive way to deal with the problem.

Another mechanical method of dealing with some flow assurance problems is the use of pipeline cleaning devices commonly known as "pigs." There are numerous pig configurations that have been used all having the same basic idea, in that the pig diameter closely matches the inner diameter of the flow line or pipeline. A pig is introduced into the flow stream and scrapes wax deposits and scale from the inner wall of the pipeline. A pig handler is designed to launch a pig through a flow line, receive the pig at the end of the run and to re-launch the pig as required to maintain a clean flow line. There have been a number of pig handling systems used in various industries over the years as disclosed in U.S. Pat. Nos. 2,801,824; 4,079,782, 4,124,065; 4,283,807; 4,350,202; 4,420,038 4,556,102; 4,566,533; 5,284,581; 5,286,376; 5,427,680; 5,676,848; 5,888,407; 6,070,417; 6,336,238; 6,409,843; 6,409,843; 6,412,135; and 6,569,255. In the context of offshore pipelines and flow lines, pig launcher/receiver systems may be subsea based, as illustrated in U.S. Pat. No. 6,336,238 or they may be supported on an offshore structure, as illustrated in U.S. Pat. No. 5,842,816.

The use of host-based pigs and pig systems have been effective to some degree in deepwater systems. However, they also have some drawbacks. When being deployed in long subsea runs, the material scraped off the inside of the pipeline wall typically tends to form an agglomerated slug, requiring increasing pressure to push the pig through the flow line, further decreasing production.

A recent technique being explored is the idea of cold flow assurance. This technique utilizes the cold subsea environment to precipitate solids intentionally from the production stream using a dedicated heat exchanger or chilling loop. The production stream exits the wellhead and enters the chilling loop. The geometry and length of the chilling loop is a function of the deep sea water temperature, the production temperature, pressure and composition, and the temperatures and pressures at which the solids form. Following precipitation, the production stream enters into the flow line or pipeline. Recognizing that the solids will build up in the chilling loop, the chilling loop is equipped with its own pigging system. The pig is periodically released to clean out the chilling loop. Examples of this type of system are shown in U.S. Pat. Nos. 6,656,366 and 6,070,417.

SUMMARY OF THE PRESENT INVENTION

In one aspect, the present invention provides a method and apparatus for a subsea, cold flow assurance system. Conceptually, cold flow process can be divided into several steps. The first step addresses the chilling aspect of the system. This includes identifying the composition of the produced hydrocarbons, as well as the wellhead temperature and pressures. This information is used to determine the size and geometry of the chilling loop with thermodynamics models that predict the produced hydrocarbon stream response to chilling conditions. Ideally, the chilling loop is modeled and designed to cause the production stream temperature to approach that of the ambient seawater temperature. The production stream then enters the production flow line or pipeline. While the main flow line or pipeline may also include some manner of flow assurance, its requirements would be greatly reduced.

The second step is directed to managing the solids that deposit or settle in the chilling loop and preparing the pigged returns for transport to the offshore structure. As noted above, this includes a subsea pig handler system to scrape the deposited or settled solids out of the chilling loop. The objective of pigging the chilling loop is to create a non-agglomerated slurry of deposited materials that is combined with the production flow. The slurry is then carried through the pipeline with minimal deposition on the flow line or pipeline walls. The second module may further include chemical conditioning means at the chilling loop to further condition the slurry for transport in the flow line. Moreover, it may include treatment systems designed to clean and recondition the pigs for continued use in the chilling loop.

The third step deals with the slurry modeling to assure that the produced solids do not plug the flow line. This would include means for monitoring the flow line performance and could include subsea monitoring means to determine if the solids management system is operating properly to create a slurry as opposed to creating a slug that could impede flow line through put.

BRIEF DESCRIPTION OF THE DRAWINGS

A better understanding of the present invention may be had with reference to the Detailed Description of the Preferred Embodiment in conjunction with the drawings in which.

DETAILED DESCRIPTION OF THE PREFERRED EMBODIMENT

Figure 1:
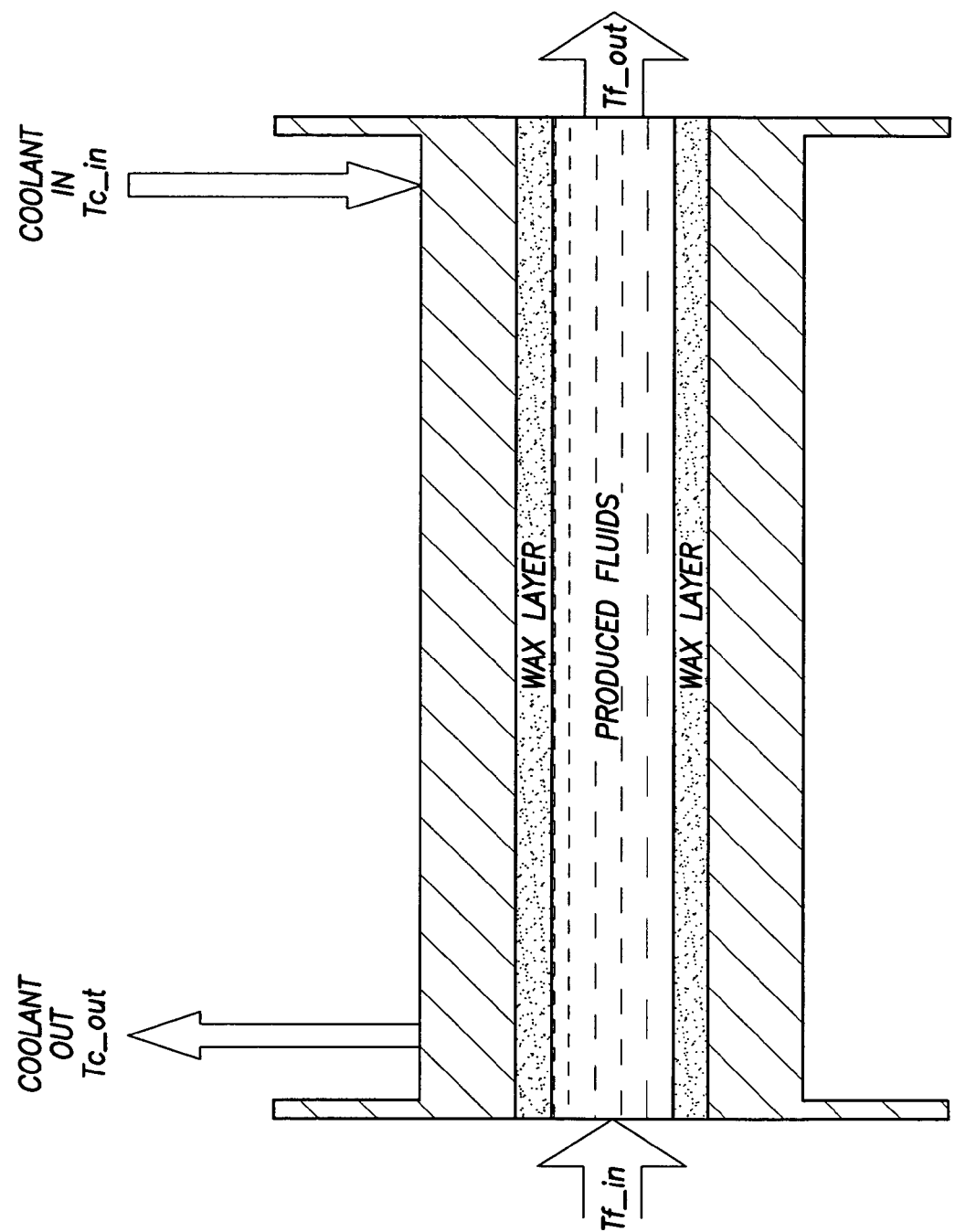
FIG. 1 is a depiction of a pipe-in-pipe counter flow heat exchanger.

In one embodiment, there is disclosed a system for maintaining production flow in a subsea pipeline having a proximate and a distal end, the pipeline being in fluid communication with a host on a distal end, the system comprising a pig handler, having an inlet system in fluid communication with at least one subsea well to receive the hydrocarbon production flow, and an outlet system in fluid communication with the proximate end of the pipeline; a subsea heat exchanger, the heat exchanger having an inlet in fluid communication with the pig handler inlet system and an outlet in fluid communication with the pig handler outlet system, in which the temperature of the hydrocarbon production flow is reduced sufficiently to cause solids to form; a pig launching system, whereby a pig may be selectively placed into the hydrocarbon production flow through the pig handler inlet system, launching the pig into the heat exchanger to remove deposited solids from the heat exchanger, a pig receiving system, whereby a pig may be removed from the hydrocarbon production flow through the pig handler outlet system prior to production flow entry into the subsea pipeline, and a pig handler indexing means wherein a pig that has entered into the pig receiving system may be positioned into the pig launching system for reuse. In some embodiments, the system also includes a subsea manifold in fluid communication with multiple subsea wells and the pig handler. In some embodiments, the pig handling system is comprised of an outer, waterproof sealed housing; an inner body, having at least two passageways therethrough that can be indexed to provide a fluid path in sealed fluid communication with the pig handler inlet system and the heat exchanger inlet, a fluid path in sealed fluid communication with the heat exchanger outlet and the pig handler outlet system; a pig storage position connected to the housing; means for loading a pig into a passageway from the pig storage position and for discharging a pig from a passageway into the pig storage position; and means for indexing the inner body within the outer housing to launch a pig stored in a passageway by bringing it into fluid communication with the hydrocarbon production flow or indexing the inner body to bring a passageway into fluid communications with the pig storage position. In some embodiments, the pig launching system and the pig receiving system are thermally isolated. In some embodiments, the system also includes a pig supply magazine for storage of pigs and a pig discharge magazine for storage of used pigs; means to selectively advance a pig from the supply magazine into an inner body passageway; and means to selectively advance a used pig into the discharge magazine from an inner body passageway. In some embodiments, said pig handler, pig launching system, pig receiving system and pig handler indexing means are retrievable. In some embodiments, the means to selectively advance the pigs is comprised of a hydraulic or mechanical system. In some embodiments, the system also includes a bypass fluid conduit between the subsea well and the heat exchanger inlet. In some embodiments, the system also includes a bypass fluid conduit between the outlet of the heat exchanger and the proximate end of the pipeline. In some embodiments, the production flow through the bypasses may be selectively controlled. In some embodiments, the heat exchanger is a pipe in the subsea environment. In some embodiments, the heat exchanger is a forced coolant pipe-in-pipe system, having inner and outer pipes, wherein production flows through the inner pipe and coolant flows through the annulus formed between the inner and outer pipes in a direction counter to the production flow direction. In some embodiments, the coolant is seawater. In some embodiments, the system also includes pump means to force the coolant through the annulus.

In one embodiment, there is disclosed a system for maintaining multiphase hydrocarbon production flow in a subsea pipeline having a proximate and a distal end, the pipeline being in fluid communication at least one subsea well at the proximate end and a host on a distal end, the system comprising a subsea heat exchanger, the heat exchanger having an inlet and an outlet, in which the temperature of the hydrocarbon production flow is reduced sufficiently to cause solids to form; a pig handler, the pig handler having an inlet system in fluid communication with the at least one subsea well and an outlet system in fluid communication with the pipeline proximate end, the pig handler further being in communication with the heat exchanger inlet and outlet, the pig handler further including a pig launching system, whereby a pig may be selectively launched into the heat exchanger inlet to remove deposited solids within the heat exchanger and a pig receiving system, whereby the pig may be removed from the hydrocarbon production flow through the pig handler outlet system prior to production flow entry into the subsea pipeline; and an inlet system bypass fluid conduit between the subsea well and the inlet of the heat exchanger. In some embodiments, the system also includes a bypass fluid conduit between the outlet of the heat exchanger and the proximate end of the pipeline. In some embodiments, the hydrocarbon production flow through at least one bypass may be selectively controlled. In some embodiments, the system also includes a sealed outer housing having inlets in fluid communication with the subsea well and the heat exchanger outlet and outlets in fluid communication with the heat exchanger inlet and the proximate end of the pipeline; a sealing inner body within the outer housing, the inner body having at least one passageway therethrough, having a stop means at one end of the passageway, the passageway adapted to receive a pig, wherein the inner body is indexed to place the stop means proximate to the outer body inlet in fluid communication with the subsea well, the passageway bearing a pig being in fluid communications with the subsea well and the heat exchanger inlet, the hydrocarbon production flow launching the pig in the passageway into the heat exchanger; and the inner body is indexed to place the stop means proximate to the pig handler outlet to the proximate end of the pipeline, the passageway being in fluid communications with the heat exchanger outlet and the pipeline, the stop means thereby capturing the pig. In some embodiments, the system also includes a pig storage location connected to the outer housing, wherein the inner body may be indexed to permit fluid communications between the pig storage location and an inner body passageway. In some embodiments, the system also includes a pig magazine and a pig discharge magazine; and means for loading a pig from said pig supply magazine into a passageway and discharging a pig from a passageway into the pig discharge magazine. In some embodiments, the means for loading and discharging pigs is comprised of hydraulic or mechanical means. In some embodiments, the heat exchanger is a pipe in the subsea environment. In some embodiments, the heat exchanger is a forced coolant pipe-in-pipe system, having inner and outer pipes, wherein production flows through the inner pipe and coolant flows through the annulus formed between the inner and outer pipes in a direction counter to the production flow direction. In some embodiments, the coolant is seawater. In some embodiments, the system also includes pump means to force the coolant through the annulus. In some embodiments, the system also includes a subsea manifold in fluid communication with multiple subsea wells and the pig handler.

In one embodiment, there is disclosed a system for maintaining production flow in a subsea pipeline having a proximate and a distal end, the pipeline being connected to at least one subsea well at the proximate end and a host on the distal end, the system comprising a subsea heat exchanger, the heat exchanger having an inlet and an outlet, in which the temperature of the hydrocarbon production flow is reduced sufficiently to cause solids to form, the heat exchanger inlet being in fluid communications with at least one subsea well; a pig handler comprising an outer sealed housing; an inner body having at least one passageway there through; a pig storage location; means for selectively placing the passageway in fluid communications with the heat exchanger inlet, the pig storage location, or the heat exchanger outlet and proximate end of the pipeline; a fluid bypass conduit between the subsea well and the heat exchanger inlet; means for advancing a pig into or out of an inner body passageway from or to the pig storage location; and means for advancing the pig into the heat exchanger inlet. In some embodiments, the system also includes the means used comprise a hydraulic or mechanical system. In some embodiments, the heat exchanger is a pipe in the subsea environment. In some embodiments, the heat exchanger is a forced coolant pipe-in-pipe system, having inner and outer pipes, wherein production flows through the inner pipe and coolant flows through the annulus formed between the inner and outer pipes in a direction counter to the production flow direction. In some embodiments, the coolant is seawater. In some embodiments, the system also includes pump means to force the coolant through the annulus. In some embodiments, the system also includes a subsea manifold in fluid communication with multiple subsea wells and the heat exchanger inlet.

In one embodiment, there is disclosed a system for maintaining production flow in a subsea pipeline having a proximate and a distal end, the pipeline being connected to at least one subsea well at the proximate end and a host on the distal end, the system comprising a subsea heat exchanger, the heat exchanger having an inlet and an outlet, in which the temperature of the production flow is reduced sufficiently to cause solids to form, the heat exchanger inlet being in fluid communications with at least one subsea well; a pig handler comprising an outer sealed housing, the outer housing providing a path from the at least one subsea well to the heat exchanger inlet and a path from the heat exchanger outlet to the proximate end of the pipeline; an indexing inner body within the outer housing, the inner having at least two passageways there through; a pig storage location; means for selectively indexing the inner body passageways to provide a fluid paths between (i) the subsea well and heat exchanger inlet in fluid communications, (ii) the heat exchanger outlet and the proximate end of the pipeline, or (iii) the pig storage location; means for advancing a pig into or out of an inner body passageway from or to the pig storage location; and means for advancing the pig into the heat exchanger inlet. In some embodiments, the means used comprise a hydraulically activated or mechanical system. In some embodiments, the heat exchanger is a pipe in the subsea environment. In some embodiments, the heat exchanger is a forced coolant pipe-in-pipe system, having inner and outer pipes, wherein production flows through the inner pipe and coolant flows through the annulus formed between the inner and outer pipes in a direction counter to the production flow direction. In some embodiments, the coolant is seawater. In some embodiments, the system also includes pump means to force the coolant through the annulus. In some embodiments, the system also includes a subsea manifold in fluid communication with multiple subsea wells and the heat exchanger inlet.

In one embodiment, there is disclosed a system for maintaining production flow in a subsea pipeline having a proximate end and a distal end, the pipeline being connected to at least one subsea well at the proximate end and a host on the distal end, the system comprising a subsea heat exchanger, the heat exchanger having an inlet and an outlet in which the temperature of the hydrocarbon production flow is reduced sufficiently to cause solids to form; a pig handler comprising an outer sealed housing, the housing having an inlet in fluid communication with the at least one subsea well, the inlet further including a selectively controlled valve having an opened and a closed position; the housing having an outlet in fluid communication with the heat exchanger inlet, the outlet further including a selectively controlled valve having an opened and a closed position; the housing further having an inlet in fluid communication with the heat exchanger outlet, further including a selectively controlled valve having an opened and a closed position; the housing further having an outlet in fluid communication with the pipeline, further including a selectively controlled valve having an opened and a closed position; an inner body within the housing, the body having at least one passageway there through, adapted to receive a pig; the housing valves in fluid communication with at least one subsea well and the heat exchanger inlet in an open position, launching a pig from a pig-bearing passageway into the heat exchanger when said passageway is in fluid communication with the subsea well and the heat exchanger inlet, and the housing valves in fluid communication with the pipeline and the heat exchanger outlet in an open position, receiving the pig from the heat exchanger outlet when said passageway is in fluid communication with the heat exchanger outlet and the proximate end of the pipeline; and a conduit bypass between the at least one subsea well and the heat exchanger inlet, through which the flow is restricted or can be restricted with a selectively controlled valve. In some embodiments, outer housing is further connected to a pig storage location, wherein the pig handler inner body may be indexed to permit movement of a pig between an inner body passageway and the storage location. In some embodiments, the pig storage location is comprised of a pig supply magazine; a pig discharge magazine; and means to move a pig from the pig supply magazine into a passageway or eject from a passageway into the pig discharge magazine. In some embodiments, the pigs are loaded or ejected utilizing hydraulic or mechanical systems.

In one embodiment, there is disclosed a system for maintaining production flow in a subsea pipeline having a proximate and a distal end, the pipeline being connected to at least one subsea well at the proximate end and a host on a distal end, the system comprising a subsea heat exchanger, the heat exchanger having an inlet and an outlet, in which the temperature of the hydrocarbon production flow is reduced sufficiently to cause solids to form; at least two indexing bodies, each within an outer sealed housing and having at least one passageway there through, one of the housings being connected to at least one subsea well and the heat exchanger inlet, the other housing being connected to the heat exchanger outlet and the pipeline proximate end, wherein a body is indexed to place a pig-bearing passageway in fluid communication with the subsea well and the heat exchanger inlet to launch the pig into the heat exchanger to remove deposited solids and the other body having passageway indexed to be in fluid communication with the heat exchanger outlet and pipeline proximate end and adapted to receive the pig and remove it from the flow to the pipeline, the at least two bodies being connected by a conduit for transfer of a pig from one body to the other. In some embodiments, the bodies have at least two passageways therethrough. In some embodiments, the system also includes a bypass conduit between the subsea well and the heat exchanger inlet and/or a bypass conduit between the heat exchanger outlet and the pipeline, each bypass with restricted flow or a selectively controlled valve to restrict the flow, wherein the first bypass conduit provides fluid path between the subsea well and the heat exchanger inlet when no inner body passageway is indexed to provide a fluid path between the subsea well and heat exchanger inlet, restricts flow to launch a pig, and the second bypass conduit: provides fluid path between the heat exchanger outlet and the pipeline proximate end while no inner body passageway is indexed to provide a fluid path between the heat exchanger outlet and pipeline proximate end, restricts flow to properly seat a received pig. In some embodiments, at least two indexing bodies are contained within a single housing, the single housing having an inlet in fluid communication with the at least one subsea well and an outlet in fluid communication with the heat exchanger inlet, and further having an inlet in fluid communications with the heat exchanger outlet and an outlet in fluid communication with the pipeline proximate end. In some embodiments, the system also includes at least one of the housings connected to a pig storage location, wherein the inner body within the housing may be indexed to receive or discharge a pig from or into the pig storage location. In some embodiments, the system also includes a pig supply magazine and a pig discharge magazine; and means for advancing a pig from the pig supply magazine into the inner body passageway and discharging a pig from the inner body passageway into the pig discharge magazine. In some embodiments, the pigs are loaded or ejected utilizing hydraulic or mechanical systems. In some embodiments, the system also includes a subsea manifold in fluid communication with multiple subsea wells and the pig handler. In some embodiments, the heat exchanger is pipe in the subsea environment. In some embodiments, the heat exchanger is a forced coolant pipe-in-pipe system, having inner and outer pipes, wherein production flow is through the inner pipe and coolant flow is through an annulus formed between the inner and outer pipes in a direction counter to the production flow direction. In some embodiments, the coolant is seawater. In some embodiments, the system also includes pump means to force the coolant through the annulus.

In one embodiment, there is disclosed a system for maintaining production flow in a subsea pipeline having a proximate and a distal end, the pipeline being connected to at least one subsea well at the proximate end and a host on a distal end, the system comprising a subsea heat exchanger, the heat exchanger having an inlet and an outlet, in which the temperature of the production flow is reduced sufficiently to cause solids to form; a pig handler comprising an outer sealed housing, the housing having an inlet in fluid communication with the at least one subsea well and an outlet in fluid communication with the heat exchanger inlet; the housing further having an inlet in fluid communication with the heat exchanger outlet and an outlet in fluid communication with the pipeline proximate end; and a translatable body within the housing, the body adapted to receive a pig and launch the pig by establishing a fluid path between the subsea well and the heat exchanger inlet or receive the pig by establishing a fluid path between the heat exchanger outlet and the pipeline proximate end. In some embodiments, the system also includes the translatable body having at least one passageway there through; and a bypass conduit either between the subsea well and the heat exchanger inlet or the heat exchanger outlet and the pipeline proximate end. In some embodiments, the system also includes the translatable body having at least two passageways there through, wherein the passageways may be selectively placed in fluid communication with the subsea well inlet and the heat exchanger inlet and the heat exchanger outlet and the pipeline proximate end. In some embodiments, the flow through the bypass conduit is restricted or may be restricted with a selectively controlled valve. In some embodiments, the system also includes a bypass between the subsea well and the heat exchanger inlet and a second bypass between the heat exchanger outlet and the pipeline proximate end. In some embodiments, the system also includes the housing connected to a pig storage location, wherein the body may be translated to receive a pig from the pig storage location or discharge a pig to the pig storage location. In some embodiments, the system also includes a pig supply magazine and a pig discharge magazine; and means for advancing a pig from the pig supply magazine into the inner body passageway and discharging a pig from the inner body passageway into the pig discharge magazine. In some embodiments, the means for advancing and discharging a pig is comprised of a fluid or mechanical system. In some embodiments, the system also includes a subsea manifold in fluid communication with multiple subsea wells and the pig handler. In some embodiments, the heat exchanger is a pipe in the subsea environment. In some embodiments, the heat exchanger is a forced coolant pipe-in-pipe system, having concentric inner and outer pipes, wherein production flow is through the inner pipe and coolant flow is through the annulus formed between the inner and outer pipes in a direction counter to the production flow direction. In some embodiments, the coolant is seawater. In some embodiments, the system also includes pump means to force the coolant through the annulus.

In one embodiment, the present invention is directed to a system for a cold flow subsea production system. In designing a cold flow production system, an operator would first determine the composition of the production stream, as well as pressure and temperature of the production stream. This may be accomplished by performing known wireline formation test and sampling during the drilling phase, or through drill stem testing. At the same time, the subsea temperature and current conditions for the planned subsea site are determined using temperature and current sensors. Given the environmental factors and the composition, temperature and pressure of the production stream, a model may be created to estimate the pressure and temperature changes required to precipitate solids and form hydrates.

The design of a cold flow system focuses on the issues of how to achieve the required rapid cooling and suspension of solids in a slurry and how to flow the suspended solids to the receiving platform or onshore. Cooling by means of heat transfer, typically through use of cold sea water may be used to achieve rapid cooling. The heat transfer can occur by natural convection cooling of the pipeline due to seawater currents or by forced convection. In the case of natural convection, no motive force is required as it relies on seawater currents to remove heat away from the hot tube surface. The heat transfer coefficient for forced convection normal to a cylinder is given approximately by Equation (1)

$$\frac{hD}{k} = 1.1b \left(\frac{Du_o\rho}{\mu}\right)^n \left(\frac{C_p\mu}{k}\right)^{1/3} \quad (1)$$

in which the constants b and n are given by Table 1, (W. H. Adams, *Heat Tansmission*, $3^{rd}$ Ed., p. 260, McGraw-Hill, New York, N.Y. (1954)).

TABLE 1

Constants for Use in Equation (1)

| $\frac{Du_o\rho}{\mu}$ | n | b |
|---|---|---|
| 1-4 | 0.330 | 0.891 |
| 4-40 | 0.385 | 0.821 |
| 40-4,000 | 0.466 | 0.615 |
| 4,000-40,000 | 0.618 | 0.174 |
| 40,000-250,000 | 0.805 | 0.0239 |

Heat removal rate is improved by forced circulation of cold seawater flow in a jacket around the heat exchanger pipe, countercurrent to the production stream. This scheme requires a pipe-in-pipe geometry and the use of a seawater pump. Heat transfer coefficients for heat removal from the flow line OD are given by Equation (2)

$$\frac{hD_{eq}}{k} = 0.023 \left(\frac{D_{eq} u_b \rho}{\mu}\right)^{0.8} \left(\frac{c_p\mu}{k}\right)^{0.4} \left(\frac{D_2}{D_1}\right)^{0.45} \quad (2)$$

in which $D_{eq}$ is the ID of the outer pipe $D_2$ minus the OD of the inner pipe $D_1$. Equation (2) is only applicable to turbulent flow, which is the norm for using countercurrent flow heat exchangers. Equation (2) is attributed to Wiegand, as may be seen at Bird, R., Stewart, W. and Lightfoot, E., *Transport Phenomenon*, at page 389, John Wiley and Sons, New York, N.Y. (1960).

Application of Equation (1) for water currents of the order of 1 ft/s for a 10.75" OD flow line gives an h equal to 202 Btu/(hr ft2 F.). Application of Equation (2) for a total coolant rate of 10,000 BPD in a jacket with an annular gap of 0.5" around the 10.75" flow line yields an h equal to 1257 Btu/(hr ft2 F.) which is ~6.2 times higher than the value achieved due to convection by sea currents. This suggests that countercurrent flow forced heat convection generally provides higher heat transfer rates than natural convection by sea-water currents. However, the comparison of these two heat exchanger options is not that straightforward since it depends on other system parameters such as the layer of wax thickness that is fouling the inner pipe wall, various convective coefficients, wall thickness and corresponding wall thermal conductivity values, sea-water currents etc.

In both heat exchanger options, means to scrape the oil-side surface to remove hydrocarbon deposits from the inside wall are required. Also in both cases, a final produced-fluids temperature of 45° F. is assumed (as opposed to 39° F. ambient seawater). After a prolonged system shutdown, cooling the contents to local seawater temperature is inevitable. It is assumed that during steady-state flow only small amounts of wax will deposit in the long offset flow line downstream of the heat exchanger as the produced fluids will inevitably cool from 45° F. to 39° F. at some point in the flow line.

For both natural and forced convection cases, the inside of the tube/heat exchanger must be cleaned regularly to remove deposits and maintain flow at reasonable pressure drop. However, there are torque limitations in the automatic rotary scraping system of conventional heat exchangers, for example, those used in the preparation of foods. These limitations mean that adaptation of conventional tube and shell-type, continuously scraped commercial heat exchanger to the cold flow system is nearly impossible. One heat exchanger manufacturer, WSA Engineered Systems of Milwaukee, Wis., has extensive experience with water scale cleaning exchangers where the cleaning elements are driven by the flow itself instead of using linear motion mechanical plungers or rotary equipment to clean the tubes. In one aspect, the greater the number of tubes, the greater is the concern for reliability of mechanical cleaning. However, multiple parallel paths have the advantage of continued flow in the event of one or more of the paths become plugged. Because of mechanical concerns (i.e. torque limitations for mechanical scrapers with conventional multiple parallel tube exchangers) and desire for mechanical simplicity and reliability, a single tube with a jacket pipe was considered initially as the preferred heat exchanger configuration for the cold flow system although the option of the bare heat exchanger/pipe directly cooled by seawater currents may be the most economically-suitable option especially for certain field characteristics such as low production rates and marginal reservoir economics. A scraper pig will be utilized to remove deposits.

FIG. 1 displays graphically the forced convection heat exchanger option. The overall heat transfer coefficient varies along the length of the heat exchanger due to the continuous change of the fluids' temperatures and thus of their physical properties along the heat exchanger. Assuming that there is a uniform deposit layer having thickness w deposited on the inside wall, the overall heat transfer coefficient $U_1$ from the bulk of the produced fluids to the bulk of the coolant in the jacket is determined by the following heat transfer mechanisms:

1. multiphase flow convection from the bulk of the produced fluids to the deposit/fluid interface;
2. conduction through a deposit layer of thickness w;
3. conduction through the pipe wall; and
4. convection from the pipe outer wall to the bulk of the coolant.

The above heat transfer mechanisms are mathematically expressed by the following equation:

$$U_1 = \frac{1}{\frac{1}{h_f} + \frac{d_i}{2k_{dep}}\ln\left(\frac{d_i}{2\delta_w}\right) + \frac{d_i}{2k_{pipe}}\ln\left(\frac{d_o}{d_i}\right) + \frac{d_i}{d_o h_w}} \quad (3)$$

that provides the $U_1$ factor with reference the pipe inside diameter, as shown in Eq. 3 below:

The parameters $h_f$ and $h_w$ are the convective heat transfer coefficients from the bulk of the produced multiphase fluid mixture to the edge of the deposit and from the outside of the inner pipe to the bulk of the water in the water jacket. The quantities $k_{dep}$ and $k_{pipe}$ are the wax and the pipe material thermal conductivities while $d_o$ and $d_i$ are the inner pipe's inside and outside diameters respectively. The parameter $h_w$ can be calculated from Equation (2) based on the geometry of the jacket and the injection rate and properties of the seawater coolant. The convective coefficient $h_f$ can be derived from the various published correlations for two-phase convective heat transfer in pipes or by use of a two-phase homogeneous model in conjunction with the Chilton-Colburn relation for heat and momentum transfer, namely $$\frac{f}{2} = \frac{h_f}{WC_p}\left(\frac{C_p \mu}{k}\right)^{2/3} \quad (4)$$

where W is the total mass rate of liquid and gas.

The parameter f is the Fanning friction factor for single-phase flow in pipes related to the frictional pressure drop by Equation (5). The friction factor f is easily calculated from the Serghides explicit correlation (T. K. Serghides, *Estimate Friction Factor Accurately*, Chem. Eng., Mar. 5, 1984, pp. 63-64) as a function of the Reynolds number $N_{Re}$ and the pipe dimensionless roughness $\epsilon/D$ (see Equations (6-9)).

$$\frac{\Delta P}{L} = \frac{2f\rho V^2}{D} \quad (5)$$

$$f = \frac{1}{4\left[A - \frac{(B-A)^2}{C-2B+A}\right]^2} \quad (6)$$

where $$A = -2\log\left(\frac{\frac{\epsilon}{D}}{3.7} + \frac{12}{N_{Re}}\right) \quad (7)$$

$$B = -2\log\left(\frac{\frac{\epsilon}{D}}{3.7} + \frac{2.51A}{N_{Re}}\right) \quad (8)$$

$$C = -2\log\left(\frac{\frac{\epsilon}{D}}{3.7} + \frac{2.51B}{N_{Re}}\right) \quad (9)$$

The overall heat transfer coefficient $U_1$ determines the total heat rate $q_T$ lost by the produced fluids. This heat rate $q_T$ is partly added to the coolant ($q_1$) and raises the coolant temperature from $T_{wat-in}$ to $T_{wat-out}$ and partly lost to the ambient ($q_2$) via convection to the inner surface of the jacket pipe followed by conduction through the wall of the jacket pipe and finally through convection from the outer surface of the jacket pipe to the seawater. The total heat rate $q_T$ is given by Equation (10)

$$q_T = q_1 + q_2 \quad (10)$$

where $q_1$ and $q_2$ are given by Equations (11) and (12).

$$q_1 = W_{wat} C_{pw}(T_{wat-out} - T_{wat-in}) \quad (11)$$

$$q_2 = U_2 A\left(\frac{T_{wat-out} + T_{wat-in}}{2} - T_{wat-in}\right) \quad (12)$$

where $W_{wat}$ is the water coolant mass rate, $C_{pw}$ the sea water specific heat and $U_2$ is the overall heat transfer coefficient that determines the heat rate $q_2$ lost to the ambient and is calculated from equation (13)

$$U_2 = \cfrac{1}{\cfrac{d_i}{d_{i-jacket} h_{w-jacket}} + \cfrac{d_i}{2k_{pipe}} + \ln\left(\cfrac{d_{o-jacket}}{d_{i-jacket}}\right) + \cfrac{d_i}{d_{o-jacket} h_{out}}} \quad (13)$$

The convective coefficient hw-jacket can be calculated by the Chilton-Colburn relationship (Equation (3)) with the equivalent diameter ($d_{i\text{-}jacket}-d_o$) substituted for the diameter d as recommended in C. Bennet and J. Myers, *Momentum, Heat and Mass Transfer*, p. 389, McGraw Hill Book Co., New York, N.Y. (1982). The coefficient $h_{out}$ is determined by Equation (1) using a Reynolds number determined by the sea-water current velocity, density and viscosity and the jacket outside diameter.

The total heat rate $q_T$ is known since it can be determined from the mass rate of the produced oil and gas and water and the desired outlet temperature of the production stream according to Equation (14)

$$q_T = (W_L C_{pL} + W_G C_{pG} + W_W C_{pW})(T_{inlet} - T_{outlet}) \quad (14)$$

Equations (11) and (12) substituted into Equation (10) yield Equation (15).

$$q_T = \left[ W_{wat} C_{pW} + \frac{U_2 A}{2} \right] (T_{wat-out} - T_{wat-in}) \quad (15)$$

The total heat rate $q_T$ lost by the produced fluids is also related to the overall heat transfer coefficient $U_1$ by Equation (16)

$$q_T = U_1 A \left( \frac{(T_{inlet} - T_{wat.out}) - (T_{outlet} - T_{wat.in})}{\ln\left(\frac{(T_{inlet} - T_{wat.out})}{(T_{outlet} - T_{wat.in})}\right)} \right) \quad (16)$$

Equations (15) and (16) represent a system of two equations with two unknowns (A and $T_{wat-out}$) and can be solved via a computer program with a series of automatic iterations.

The overall heat transfer coefficient for this configuration is given by Equation (3) in which, the heat transfer convective coefficient $h_w$ represents convection from the outer wall of the pipe to the ambient seawater. Equation (1) in conjunction with Table (1) is to be used for calculating $h_w$.

A computerized program, such as an MS Excel spread sheet may be used to calculate the required heat exchange area and thus of the length of the heat exchanger. Comments on various input and output cells greatly assist the use of this calculation program. The calculation steps involved are:

1. Utilizing the HYSYS program with the fluid reservoir composition, develop tables of the produced fluid physical properties covering the range of pressures and temperatures to be encountered in the heat exchanger. These properties include, oil volume fraction, oil and gas densities, viscosities, thermal conductivities and heat capacities. HYSYS is a commercially available process model program marketed by Hyprotech, a division of Aspen Technologies, Inc.

2. Specify inlet oil rate, pressure and temperature

3. Specify number of tubes, tube ID, OD and roughness.

4. Specify jacket pipe ID and roughness.

5. Specify desired production stream outlet temperature (i.e. 44 F., 5 F. higher than ambient seawater)

6. Specify seawater injection rate and inlet temperature (i.e. 39 F.).

7. Calculate overall heat transfer coefficients U1, U2 from Equations (3) and (13) utilizing physical properties at the inlet P & T condition.

8. Calculate the required heat transfer exchange area A and the coolant outlet temperature $T_{wat-out}$ by simultaneously solving Equations (15) and (16).

9. Iterate by repeating steps 7 and 8 utilizing the predicted outlet pressure and temperature conditions 10. Repeat steps 7, 8 and 9 until the calculated heat transfer area converges to a limit within a 1% tolerance.

For the purposes of the heat exchanger design, in the above enumerated steps, the thermal conductivity of the deposits $k_{dep}$ can be approximated by the thermal conductivity of a pipeline wax deposit.

TABLE 1

Scraped Surface Counterflow and Bare Pipe Heat Exchanger Sizing

| Low | High | Input Data | <Red Cells Only> | | | Homogeneous Fluid Properties | | | SeaWater Properties @ 7000' | | |
|---|---|---|---|---|---|---|---|---|---|---|---|
| 3000 | 7000 | P | 4000 | Psig | OK | Lambda | 0.705 | VF Liq | Avg Tw | 51.5 | F |
| 39 | 170 | T | 150 | Deg F. | OK | RhoF | 36.51 | Lb/Ft^3 | RhoW | 64.202 | Lb/Ft^3 |
| 15,000 | 60,000 | Qo | 60000 | Bbl/Day | OK | MuF | 0.680 | Cp | MuW | 1.468 | Cp |
| 1 | 24 | N | 1 | Tubes | OK | CpF | 0.6041 | Btu/Lb F | CpW | 1.0013 | Btu/Lb F |
| 100 | 350 | Uo | 21.3 | Engl. U | Ck Range | KF | 0.0501 | Engl. U | KW | 0.3425 | Engl. U |
| 39 | 49 | Tout | 44 | Deg F. | OK | (Interpolated below) | | | (cf "Seawater" in Folder "Properties") | | |
| 1 | 50 | TriseW | 25 | Deg F. | OK | Qw(gpm) = 1750 | | | | | |
| 0.5 | 8 | Idtube | 7.001 | In | OK | 11 = Next Case # | | | | | |
| 7.001 | 14.002 | Odtube | 8.625 | In | OK | Odshell = 10.75 | | | | | |
| 0 | 0.005 | EpsTube | 0.0008 | In | OK | Maxwaxthick(in) 0.05 | | | sea water currents(ft | 0.01 | |
| 7.001 | 24 | Idshell | 9.75 | In | OK | Kwax = 0.1 | | | | | |
| 0 | 0.005 | EpsShell | 0.0018 | In | OK | Kpipe = 27 | | | | | |

<<< NOTE: Be sure Tools/Options/Calculation/Iteration Box is checked >>>
<<< NOTE: Do not insert any rows before 128 or or columns before L >>>

TABLE 1-continued

Parameters Calculated From These Inputs

| | | | | | | | | |
|---|---|---|---|---|---|---|---|---|
| Qo | 3.899 | Ft^3/Sec | | | | | | |
| Qg | 1.630 | Ft^3/Sec | | | | | | |
| wo | 637606 | Lb/Hr | | | | | | |
| wg | 89065 | Lb/Hr | | | | | | |
| wF | 726671 | Lb/Hr | | 57.87063902 | | | | |
| q | 43386856 | Btu/Hr | | 32756398.8 | | | | |
| DT1 | 92.12936 | F. | | 111 | 106 | | | |
| DT2 | 5 | F. | | 5 | | | | |
| Lmtd | 29.90 | F. | | 34.19253045 | | | | |
| Ao | 68230 | Ft^2 | | 142877.9306 | | | | |
| Ltube | 37226 | Ft | <====CC-FLOW | 77953.64862 | <===BarePipe | | | |
| Af | 0.2673 | Ft^2 | 37226.20882 | | | | | |
| Vtube | 20.684 | Ft/Sec | | | | | | |
| NreF | 964569 | — | | | | | | |
| FmF | 0.01368 | — | | | | | | |
| NprF | 19.81 | — | | | | | | |
| NstF | 0.00187 | — | | | | | | |
| hF | 383.6 | Engl. U | | | | | | |
| DeltaP Tb | 1471.4 | Psi | | | | | | |
| Pig Time RT | 59.99 | Minutes | | | | | | |
| Max Wax | 1.25 | Bbl | | | | | | |
| Max Wax | 0.031 | mm | | | | | | |
| Qw | 3366.0 | Gpm | | | | | | |
| Vshell | 34.58 | Ft/Sec | | | | | | |
| AvgTW | 51.5 | F. | | | | | | |
| NreW | 211010 | — | NreSeaW_bare | 467.8015534 | | | | |
| FmW | 0.02307 | — | NreSeaW_jacket | 583.0570086 | | | | |
| NprW | 10.38 | — | NprSeaW | 10.38 | | | | |
| NstW | 0.00485 | — | | | | | | |
| hW | 4849.8 | Engl. U | hWSeaW_bare | 12.3 | | hw_Idtube | 4114.647 | |
| DeltaP Sh | 75909.9 | Psi | hwSeaW_jacket | 11.0 | | | | |
| HpW | 149049.1 | Hp | | | Tw-out=== | 57.87064 | 0.649061 | 32756399 |
| Ucalc | 21.26519 | Engl. U | Ucalc2_BarePipe= | 8.881 | U2====> | 16.51269 | | |

Where Input Parameters are:
P—Inlet pressure to the Heat Exchanger, psia
T—Inlet temperature, ° F.
Qo—Oil flow rate through the heat exchanger, bpd
N—number of tubes in the general shell and tube countercurrent flow heat exchanger option
Uo—Overall heat transfer coefficient for countercurrent flow exchanger option, Btu/(hr ft$^2$° F.)
Tout—Desired flow outlet temperature for production stream, ° F.
TriseW—Allowed seawater temperature rise for countercurrent flow heat exchanger option, ° F.
IdTube—Inside diameter of heat exchanger Tube(s), in
Odtube—Outside diameter of heat exchanger Tube(s), in
EpsTube—Roughness of tube inside wall, in
IdShell—Inside diameter of shell, in
EpsShell—Roughness of shell inside wall, in and
Calculated Parameters are:
Qo—Oil volumetric flow rate, Ft^3/Sec at P & T
Qg—Gas volumetric flow rate at P & T, Ft^3/Sec
wo—Oil mass flow rate, Lb/Hr
wg—gas mass flow rate, Lb/Hr
wF—Total Fluid mass flow rate, Lb/Hr
q—Total produced fluid heat duty, BTU/Hr
DT1—Delta t driving force for heat transfer at produced fluid inlet, ° F.
DT2—Delta t driving force for heat transfer at produced fluid outlet, ° F.
Lmtd—Logarithmic mean temperature driving force, ° F.
Ao—Cross sectional tube flow area, ft$^2$
Vtube—Average flow velocity in the tube(s), ft/sec
NreF—Produced fluid Reynolds number, dimensionless
FmF—Produced fluid Moody friction factor,
NprF—Produced fluid Prandtl number (a ratio of momentum diffusivity/thermal diffusivity)
NstF—Produced fluid Stanton number
hF—Produced fluid-side heat transfer coefficient, BTU/(Hr Ft$^2$° F.)
DeltaP Tb—Process fluid pressure drop in the tube, Psi
Pig Time RT—Time for one round trip of a pig moving without slip, Minutes
Max Wax—Maximum wax volume that could precipitate in the above travel time, assuming all the wax in the produced oil precipitated and deposited, Bbl
Max Wax Thick—Maximum wax layer thickness (see above comment), millimeters
Qw—Seawater flow rate to cool the produced fluids, gpm
Vshell—Average flow velocity in the annulus, Ft/Sec
AvgTW—Average seawater temperature ° F.
NreW—Seawater Reynolds number based on equivalent diameter of the annulus,—
FmW—Seawater Moody friction factor
NprW—Seawater Prandtl number
NstW—Seawater Stanton number, the ratio of the overall heat transport to the wall to the convective effects in the mainstream
hW—Seawater-side heat transfer coefficient, BTU/(Hr Ft ° F.)
DeltaP Sh—Pressure loss to friction in the annulus, Psi
HpW—Seawater pump hydraulic horsepower, Hp
Ucalc2_BarePipe—Heat transfer coefficient for direct heat convection to ambient seawater for the bare pipe option only
Ucalc—Overall heat transfer coefficient for countercurrent flow heat exchanger, Btu/(hr ft$^2$ F.)

NreSeaW_bare—Reynolds number of seawater around the bare pipe

NreSeaW_jacket—Reynolds number of seawater in the jacket

NprSeaW—Prandtl number of seawater hWSeaW_bare—Heat convective coefficient from outside of bare pipe to seawater hwSeaW_jacket—Convective heat coefficient from outside of inner pipe to bulk of seawater in the annulus, Btu/(hr ft$^2$° F.)

Tw-out—Outlet seawater temperature for countercurrent heat exchanger option, F

U2—Convective heat transfer coefficient from bulk of seawater in the jacket to the ambient, Btu/(hr ft$^2$° F.)

hw_Idtube—Convective heat transfer coefficient from outside of inner pipe to bulk of seawater in the annulus, Btu/(hr ft$^2$° F.)

EXAMPLE

Figure 2:
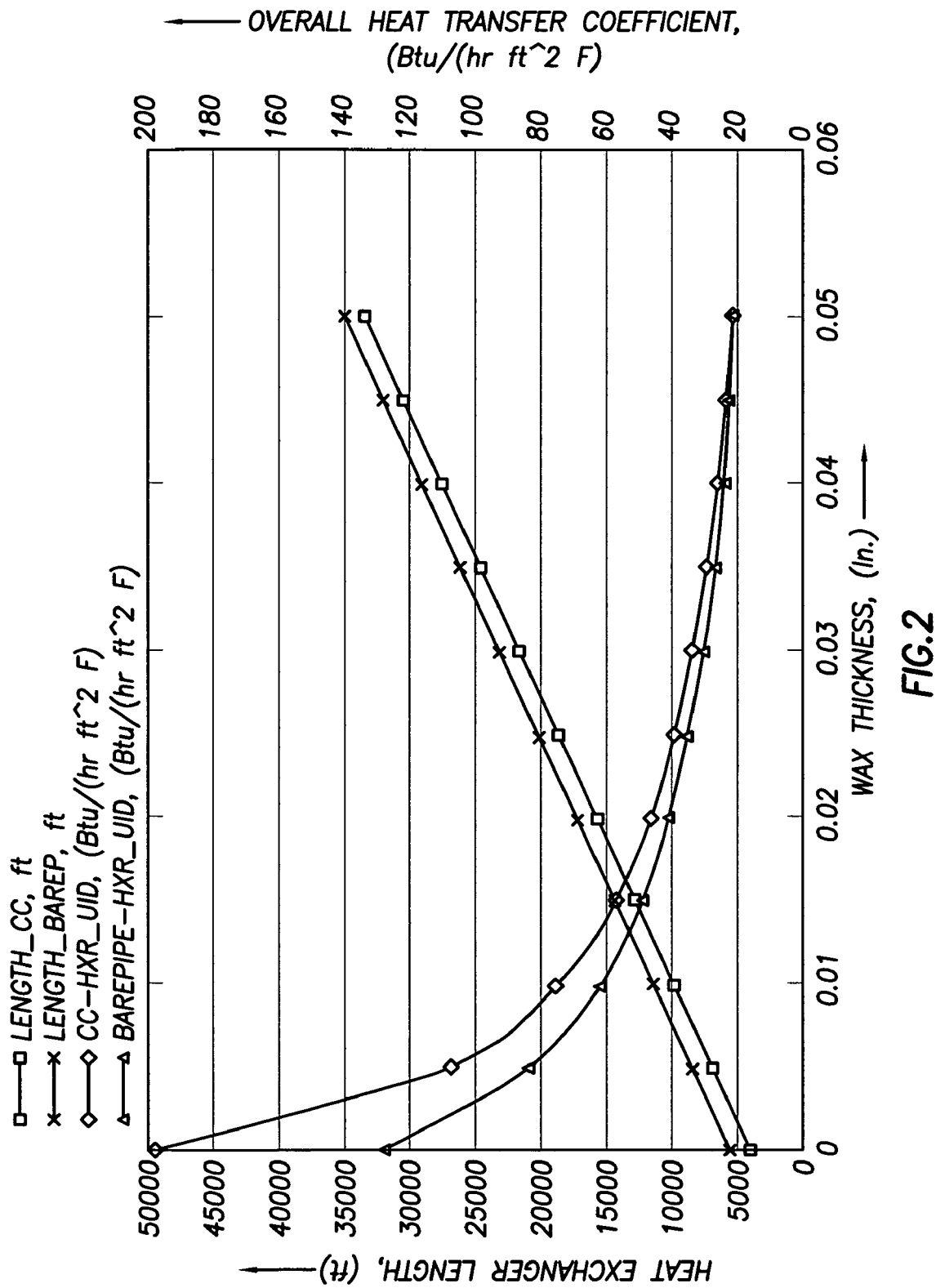
FIGS. 2-4 are plots of heat exchanger lengths and overall heat transfer for a bare pipe and counter flow pipe-in-pipe heat exchangers under varying subsea current conditions.
Figure 3:
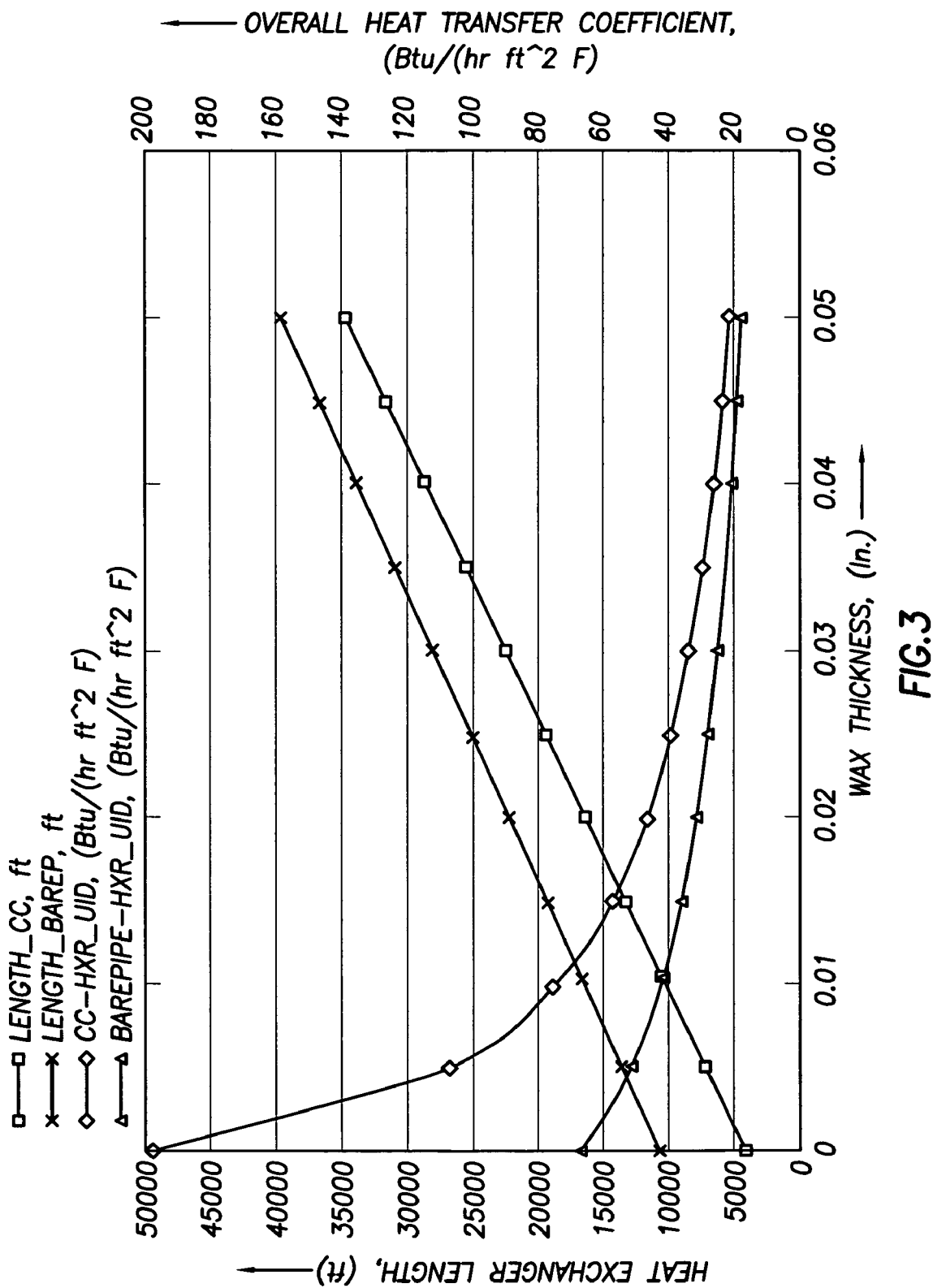
Figure 4:
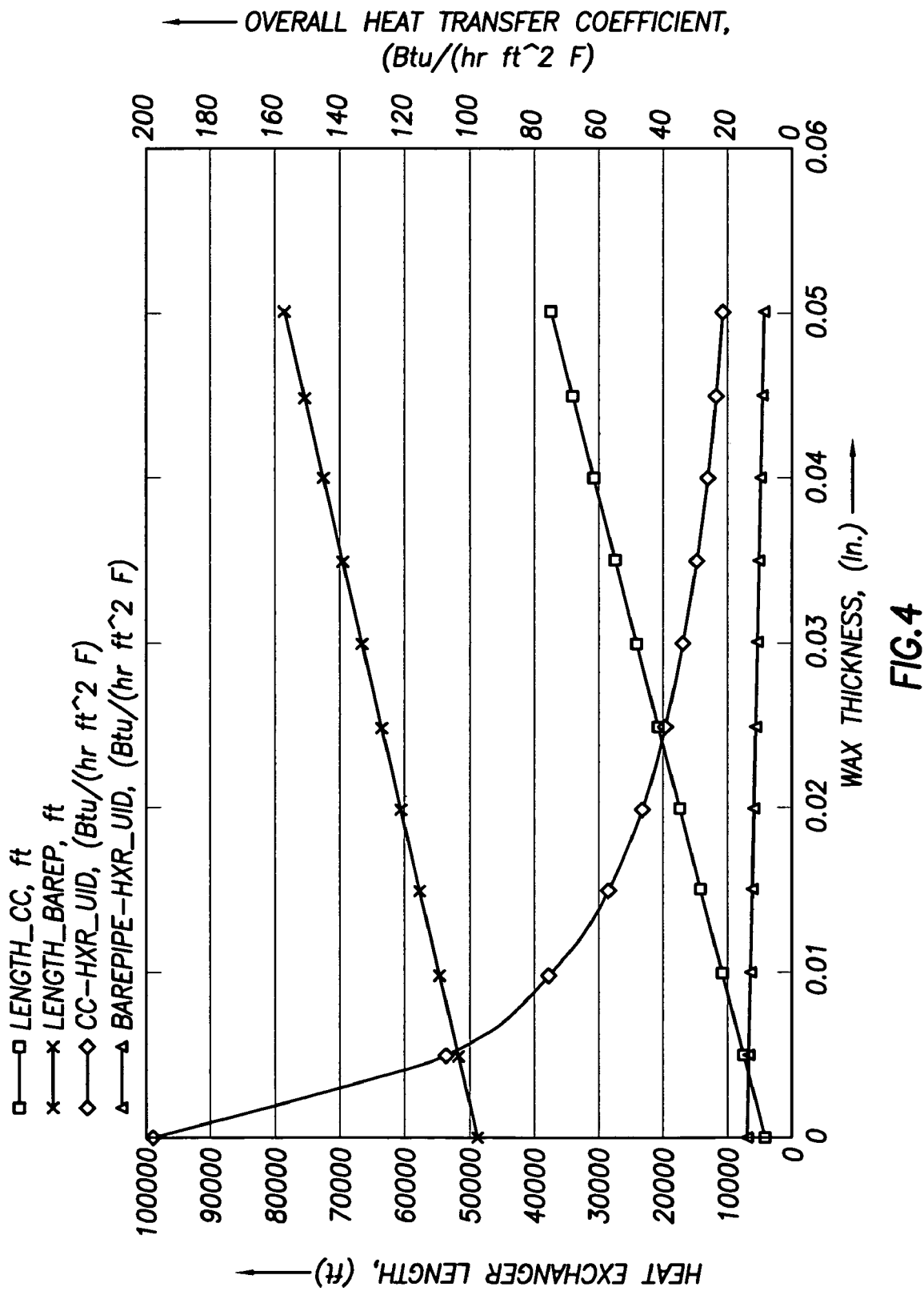

Exemplary calculations have been performed utilizing typical base-case conditions for a known reservoir producing 60,000 BPD with zero water cut, including its oil pressure, volume, temperature (PVT) properties, inlet pressure and temperature of 4000 psig and 150° F., an exchanger ID and OD of 7.001" and 8.625", a jacket pipe OD of 9.75" and a wax thermal conductivity of 0.1 Btu/(hr ft F). FIGS. 2-4 show the predicted heat exchanger lengths for both exchanger options (i.e. countercurrent flow of seawater and direct convection due to seawater currents). The countercurrent heat exchanger has a significant advantage over the bare-pipe option only for very low (near zero) sea-water currents. For water currents of the order of 2 ft/s (customary in the Gulf of Mexico) there is not much difference between the two heat exchanger options. For a maximum deposit thickness of 0.01 inches, the required length of either heat exchanger type is ~10,000 ft. Due to partial self-burial of a pipe and the resultant decrease in the overall heat transfer coefficient, it is recommended that a bare-pipe heat exchanger be lifted off the sea floor by at least 5 ft. Assuming the deposits on the inner wall of the heat exchanger pipe can be effectively scraped down to a thickness of 0.010", a bare-pipe exchanger length of ~16400 ft will be sufficient to cool down 60,000 BPD of oil and the associated gas (known producing reservoir fluid) from 150° F. to 44° F. under the pessimistic assumption of only ⅓ ft/s sea-water current. The corresponding length of a countercurrent flow heat exchanger was calculated to be 10,400 ft. The countercurrent provides a more reliable heat transfer but with increased complexity and cost. The use of Low Dosage Hydrate Inhibitors (LDHIs) is contemplated in the practice of the present invention. Certain LDHIs prevent formation of hydrates. Other LDHIs allow the conversion of water into a fine dispersion of hydrate crystals that are easily suspended in the oil phase and transported as a slurry through the bare flow line.

A recent concept for the Cold Flow System is presented in FIG. 5 below. It shows two wells, a manifold, a heat exchange, buoy, single pipeline, and arrival platform. A whole system might include also multiphase pumps and other subsea equipment. Instead of a single heat exchanger for the production system, a heat exchanger could be used for each wellhead and installed upstream of the subsea manifold.

A major component of the envisioned "cold flow" is a self-cleaning heat exchanger (i.e. cooler) located on the sea floor for the purpose of rapidly cooling the oil-water-gas production stream and producing a slurry of hydrate and wax crystals that can be transported to the receiving facility. The self-cleaning feature of the heat exchanger must be in place to assure that deposits will not cause fouling of the heat exchange area. The current heat exchanger options are the bare-pipe and the countercurrent flow type. The bare-pipe option appears the most attractive from a cost, simplicity of operation and subsea reliability point of view.

Currently, one subsea cooler with a bypass and scraper pig equipment is envisioned. If large water cuts must be dealt with, the option exists to separate the produced water and re-inject it to the formation. After cooling the hydrocarbon fluids and pigging the heat exchanger, the deposits can be chopped up into fine particles, if necessary, by a mechanical chopping device and re-mixed with the fluids.

The heat exchanger is a single tube configured in the shape of a horizontal round loop approximately 15000 feet long and 7.0" inside diameter lifted 5 ft off the sea bed. A pipe-in-pipe configuration with countercurrent flow of coolant in the annulus is a system option for cases of inadequate sea-water current (less than 0.1 ft/s). The scraper is a cylindrical pig moving along with the fluid. A 60 horsepower sea-water injection pump and associated power distribution and valving will be needed for the countercurrent heat exchanger option utilizing a 9.75" ID jacket pipe. For this option an exchanger length of only 10000 ft will be needed.

Figure 5:
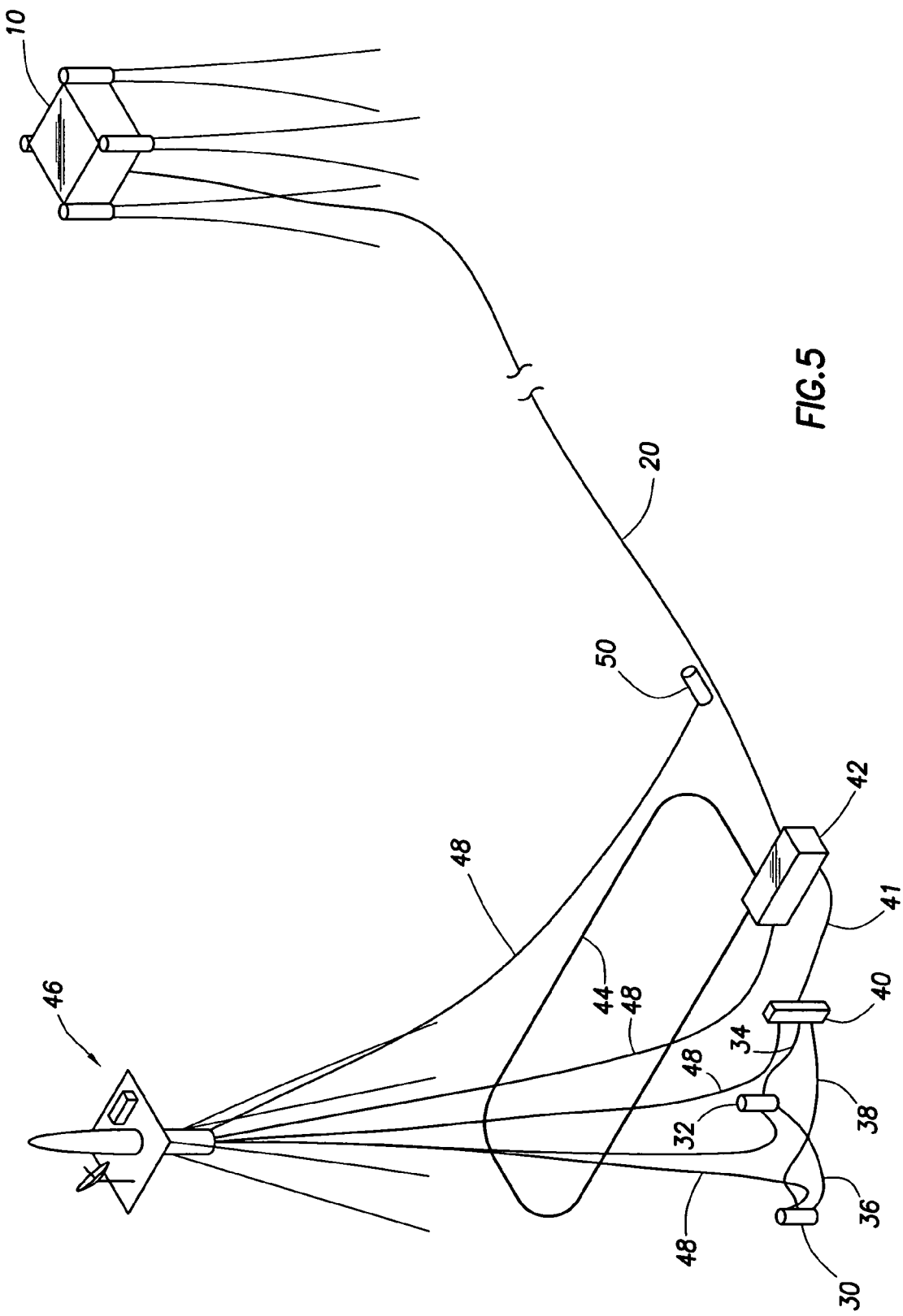
FIG. 5 is a depiction of a subsea installation in which multiple wells feed into a manifold connected to a bare pipe single loop heat exchange system.

FIG. 5 is a simplified depiction of the cold flow system of the single loop, bare pipe embodiment. In FIG. 5, an offshore platform 10 is shown as a terminus of subsea pipeline 20. It will be appreciated that pipeline 20 may terminate at an offshore installation or an on-shore installation. Two production subsea trees 30 and 32 are depicted in FIG. 5. The production from both subsea trees 30 and 32 is fed into a manifold 40 via flow lines 38 and 34, respectively. Further, subsea trees 30 and 32 are interconnected by flow line 36. It will be appreciated that the simplified production system of FIG. 5 is not intended to show all of the elements normally included in a subsea production system, such as flow line jumpers, pipeline skids and other necessary equipment. FIG. 5 is simply intended to provide a context for the present invention. The combined production flow from wells 30 and 32 is transported from manifold 40 to cold flow module 42 through flow line 41. The cold flow module 42 is connected to a chilling loop/heat exchanger 44, which returns to cold flow module 42. The heat exchanger 44 is depicted as a single open loop in FIG. 5. However, it will be appreciated that the geometry, size and configuration of the heat exchanger 44 may take various forms based on the modeling done. In FIG. 5, a tethered buoy 46, having power, control systems, chemical storage and communications capability, is connected via control umbilicals 48 to wells 30, 32, manifold 40 and cold flow module 42. The tethered buoy 46 may be used to monitor the subsea elements, send power and control signals activating the subsea systems, as well as communicate with offshore platform 10 or other support facility. Umbilicals 48 are typically multi-conductor systems capable of providing power, communications and chemicals to the various subsea systems. The tethered buoy 46 is further connected via umbilical 48 to a pipeline 20 flow assurance module 50. Module 50 would typically include monitoring and communications systems. It may also be used to house additional flow assurance systems such as chemical injection or additional pigging systems. While it is contemplated that umbilicals 48 will provide power and control to the cold flow system, the system and its components will typically include ROV interfaces to permit various aspects of operation of the trees, manifold and pig handler to be controlled by an ROV. Moreover, the system would further include ROV hot stab interfaces to permit the ROV to inject hydraulic fluid into the system for control purposes.

The pig handling systems of the present invention are designed to be connected to the heat exchanger 44 so as to sweep solids and hydrates from the sides of the pipe and place them into a slurry. A number of differing pig launcher design systems have been considered for use in the present invention. It is contemplated that each of the pig launcher systems may be utilized with the heat exchanger 44.

Figure 6:
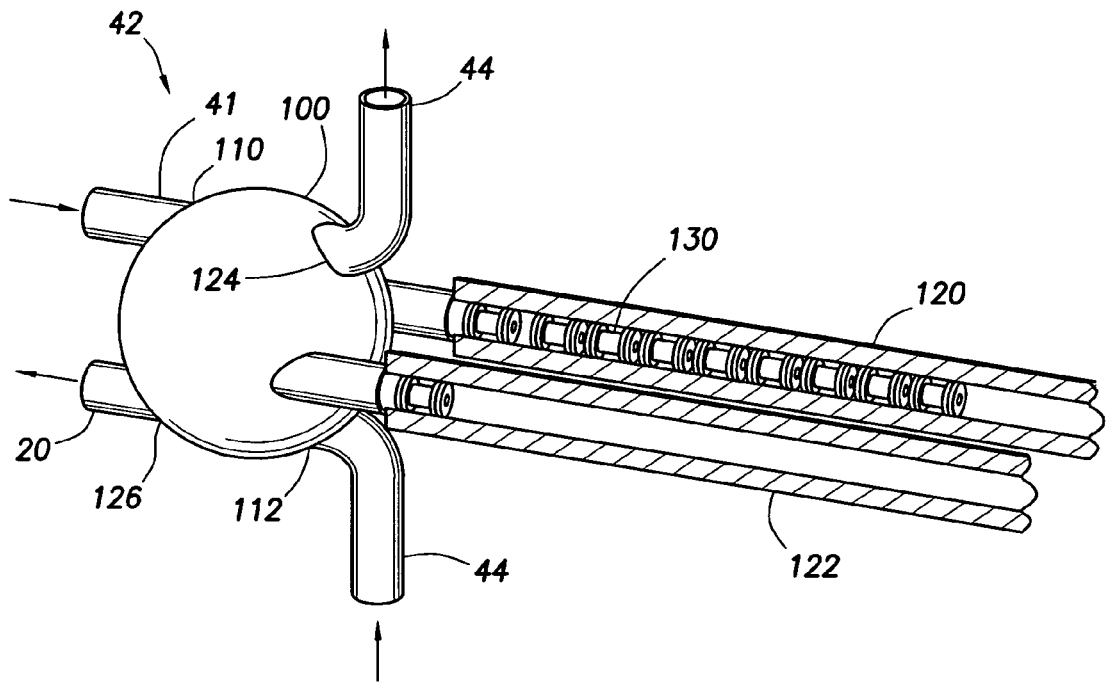
FIG. 6 is an external view of one embodiment of a pig handler.
Figure 7:
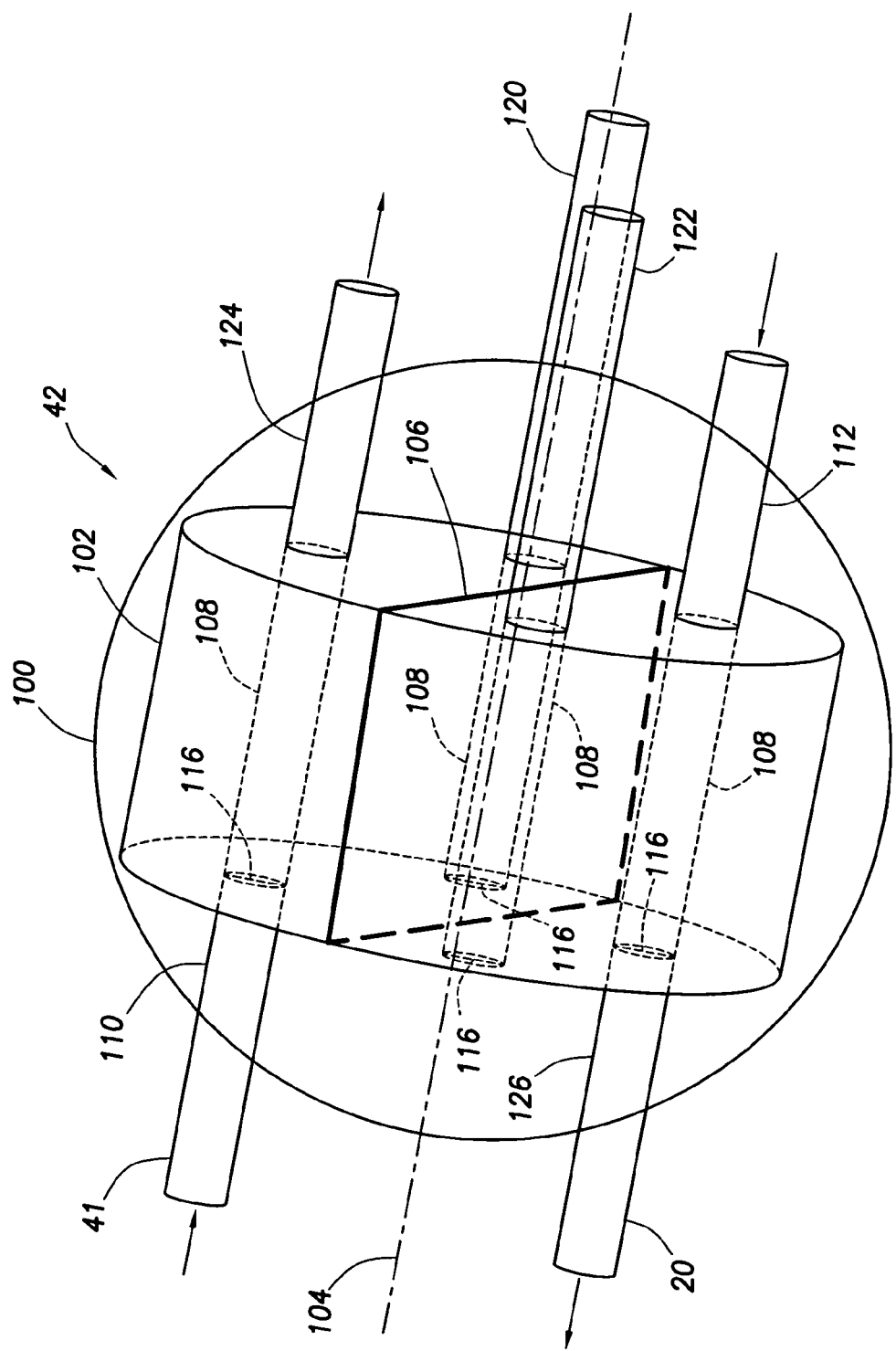
FIG. 7 is a phantom view of the pig handler of FIG. 6.

FIGS. 6 and 7 are illustrative of a Ball type pig handler 42. In FIG. 6, the pig handler body 100 is shown as being generally spherical in shape having inlet ports 110 and 112 in fluid communications with flow line 41 from manifold 40 with the heat exchanger 44 outlet, respectively. Direction of production flow is indicated through the use of arrows in FIG. 7. The body 100 further has a set of outlet ports 124 and 126 in fluid communications with the heat exchanger 44 inlet and the proximate end of the pipeline 20. Within body 100 is revolving cylindrical ball 102 (FIG. 7), capable of being selectively rotated about axis 104. The ball 102 is a segmented cylinder or sphere having a heat barrier 106 designed to isolate thermally the two sides of the ball 102. The ball 102 includes multiple passageways 108 that may be rotated to place the passageways 108 in fluid communication with a set of inlet/outlet ports, i.e., 110 and 124 (from the flow line 41 to the heat exchanger 44 inlet) or 112 and 126 (from the heat exchanger 44 outlet to the proximate end of the pipeline). The body 102 may also be rotated to place a selected passageway 108 in fluid communication with a pig supply magazine 120 containing multiple pigs 130. Similarly, the body may be rotated to place a passageway in fluid communication with a pig discharge magazine 122 or other parking position (not shown) for storage of used pigs. Pig supply 120 and discharge 122 magazines are designed such that they may be replaced, for example, by ROV as the pigs become worn and their effectiveness decreases. The pig shown in FIG. 6 is a multiple wiper pig having a reduced body diameter. It will be appreciated that different pig designs may be selected for effectiveness in dealing with varying production and the solids deposited and hydrates formed in the heat exchanger. The decision to launch a pig 130 may be based on a set interval or in response to pipeline flow characteristics monitored at flow assurance module 50 (FIG. 5) or on the offshore platform 10. In operation, a pig 130 is advanced into passageway 108, mechanically, using fluid assist system or production flow passageway 108 until it abuts against a stop bar 116 (FIG. 7). With reference to FIG. 7, the ball 102 is then rotated, placing the pig-bearing passageway 108 into fluid communication with the production flow entering inlet port 110 from the flow line 41 and existing the body 100 through outlet port 124, entering the heat exchanger 44 inlet. The production flow launches the pig 130 into the heat exchanger 44. The ball 102 may be rotated by means of hydraulic power or electrical power provided through umbilical 48 (not shown). The pig 130 runs through the heat exchanger 44 scraping deposits and hydrates off of the walls of the heat exchanger 44, creating a slurry. It will be appreciated that chemical treatments may be added through injection ports (not shown) while the pig 130 is running through the heat exchanger 44 to improve the ability of the scraped solids to remain in a slurry and not further deposit. Upon exiting the heat exchanger 44, the pig 130 will be captured by a stop bar 116 in a passageway 108 that is in fluid communication with the inlet 112 from heat exchanger 44 outlet and outlet 126 in fluid communication with proximate end. Upon capture of the pig 130, the body is rotated, removing the passageway 108 bearing pig 130 from the hydrocarbon production flow. It will be appreciated that the use of the pig launcher of the design in FIGS. 6 and 7 may use the pigs multiple times. A pig 130 may be stored and cleaned in a passageway 108 not in the production flow by the heat generated by the production flow propagating through body 102. Alternatively, when a pig 130 is no longer effective, it may be advanced into the discharge magazine 122 by fluid or mechanical means.

While the ball 102 is shown in FIGS. 6 and 7 as having more than two passageways 108 therethrough, it will be appreciated that the ball 102 may have as few as two passageways 108. A pig 130 may be loaded from a single magazine or storage area into a passageway. During that brief time, neither passageway 108 will be in fluid communication with the hydrocarbon flow from the subsea well 40 to the heat exchanger 44 or from the heat exchanger 44 to the pipeline 20. However, due to the compressible nature of hydrocarbons, system integrity may be maintained. The passageway 108 holding the pig 130 is rotated into the hydrocarbon flow from the subsea well through inlet port 110 and launched through outlet port 124 into the heat exchanger 44. Upon being received in passageway 108 that is in fluid communication with the inlet port 112 from heat exchanger 44 outlet, the pig 130 is stopped by the discharge passageway stop bar 116, as production continues to flow into the pipeline 20. The ball 102 is again rotated to interrupt hydrocarbon flow. The pig 130 is then discharged into the discharge magazine 122 or a storage area. Thereafter, the ball 102 is again rotated to place passageways 108 into fluid communication with the inlet/outlet port sets, allowing hydrocarbon production to flow through the system.

Figure 8:
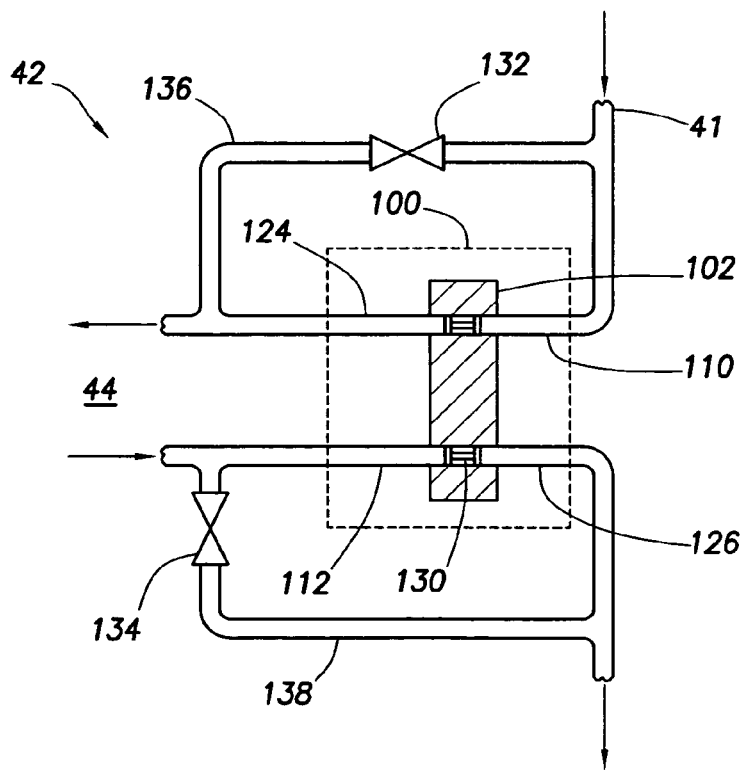
FIG. 8 is a flow path drawing of an alternate embodiment of the pig handler of FIG. 6.

It is recognized that in rotating the body 102, fluid flow disruption will occur, resulting in pressure spikes and drops seen in flow line 41, pipeline 20 and heat exchanger 44. To address this the pig handler 42 of FIGS. 6 and 7 may be further modified as shown in FIG. 8. In FIG. 8 a production bypass 136 is in fluid communication with flow line 41 and heat exchanger 44. During rotation of body 102, a valve 132 is opened to permit production flow to bypass pig handler 42 while body 102 is rotating. While body 102 is depicted in FIG. 8 as being cylindrical in nature, it may also take the ball form factor shown in FIGS. 6 and 7. The valve 132 is then closed sending all production through the pig handler. Alternatively, the bypass 136 may be designed to provide a restricted flow, resulting from, for example, a reduced diameter, such that the majority of the hydrocarbon flow is directed to the inlet. When the body 102 passageways are not in fluid communication with the hydrocarbon flow, the bypass 136 continues to provide for flow into the heat exchanger 44. A similar bypass 138 from the cold side of the heat exchanger 44 to pipeline 20 is controlled by valve 134. The valve 134 is opened during rotation of body 102 and closed once the appropriate passageway is aligned with heat exchanger 44 and pipeline 102. It will be appreciated that a single inlet bypass is all that is actually required in such situations due to the compressible nature of the fluid in the heat exchanger 44. Body 102 may have additional ports for cleaning or receipt of used pigs. Further, it has the advantage of being able to use a pig, clean it, and reuse it multiple times.

Figure 9:
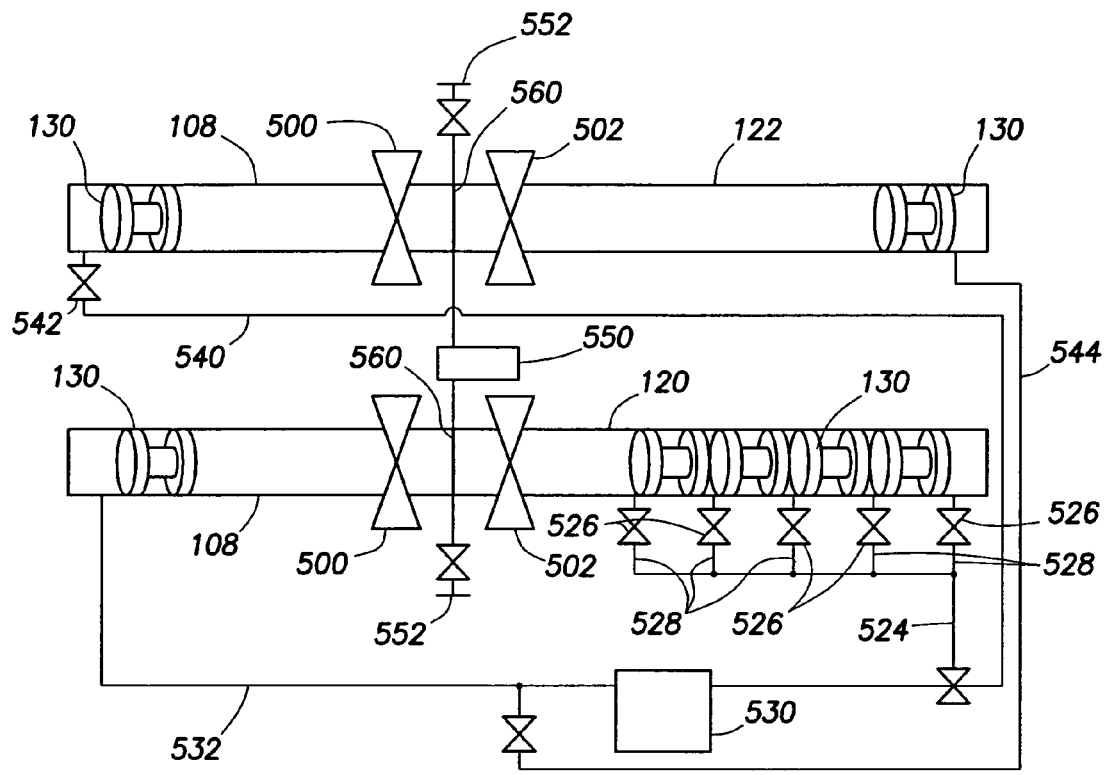
FIG. 9 is a simplified view of a pig magazine system as used within the present invention.

FIG. 9 is simplified depiction of the interface between the pig supply magazine 120, pig discharge magazine 122 and a pig handler within the present invention. For the purposes of discussion it is shown in combination with the pig handler of FIGS. 6 and 7. The pig handling system would likely be deployed subsea with the pig supply magazine 120 and pig discharge magazine 122 already installed. However, during the life of the project, it may be necessary to deploy additional pigs. FIG. 9 depicts pig supply magazine 120 being in communication with passageway 108 of the ball type system of FIGS. 6 and 7. The magazine is connected at watertight connection 560 by collet connector or other suitable means that permits connect and disconnect subsea. It will be appreciated that positioning and, conceivably, connection may be assisted by ROV. During the connection process, care must be taken not to introduce seawater into the pig handling system. Accordingly, supply magazine 120 and passageway 108 are protected by means of shut off valves 500 and 502, respectively. This seals magazine 120 and the passageway 108 from seawater contamination. Once the connection is made, the interim space between the valves 500 and 502 would most probably contain seawater and would need to be purged from the system. Accordingly, when the pig supply and discharge magazines 120 and 122 are deployed, a source of pressurized nitrogen 550 or other inert gas is also deployed. The nitrogen source 550 is connected to the interface between magazine 120 and passageway 108. The gas is introduced into the interface and the water is displaced through valve vent 552. Valve 500 is opened and valve 502 is gradually opened to permit equalization of pressure within the system. Once pressure has been equalized, valves 500 and 502 remain open during normal operations. It will be appreciated that the valves 500 and 502 are also set to close should there be a loss of control or hydraulic power to the pig handling system. The pig magazine system shown in FIG. 9 utilizes a hydraulic "kicker fluid" system to advance pigs 130 from magazine 120 into passageway 108 and from receiver passageway 112 to pig discharge magazine 122.

A hydraulic pump and fluid reservoir, generally referred to as the hydraulic source 530 is in fluid communications with the supply magazine through line 520, three way valve 522 and line 524, which feeds a series of individual lines 528, through valves 526. To advance a pig 130 from supply magazine 120 into passageway 108, valve 522 is positioned to place hydraulic source 530 in communication with the pig magazine 120. Hydraulic pressure is applied to lines 524 and 528. The first valve 526 is opened and pressure builds up behind the first pig 130, advancing it into passageway 108. A return line 532 is provided for return of hydraulic fluid from passageway 108 back to the hydraulic source 530. The first valve 526 is then closed. Subsequent pigs 130 may be advanced into passageway 108 by opening subsequent valves 528.

Similarly the pig handling system of the present invention provides for moving used pigs into a pig discharge magazine 122. The connection system for the pig discharge magazine 122 is similar to that of the supply magazine 120. To move a used pig 130 from the receiver passageway 112 into the discharge magazine, valve 522 is positioned to place hydraulic source 530 in fluid communication with line 540. Hydraulic pressure is supplied through line 540 and through valve 542 to displace the pig 130 into the discharge magazine 122. A hydraulic return line 544 is provided from pig discharge magazine 122 through valve 546 and back to hydraulic source 530. The pig supply and discharge system shown is FIG. 9 is exemplary of the type of pig supply and discharge system that may be used. It will be appreciated that alternate fluid controlled or mechanical systems may be used within the pig handling system of the present invention.

Figure 10:
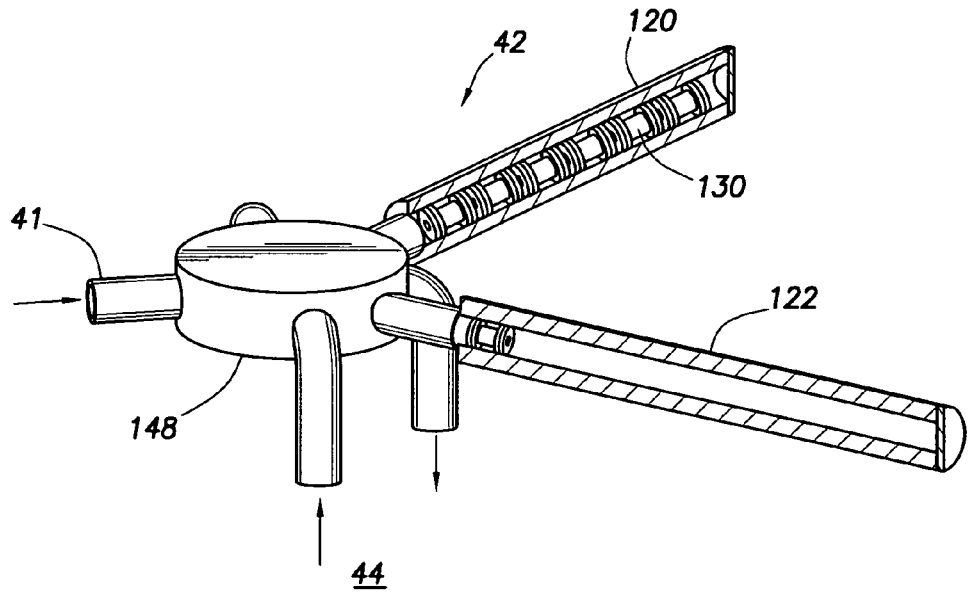
FIG. 10 is an external view of a rotating ball type pig handler.

FIG. 10 is a simplified depiction of a pig handler 42 that may be used within the context of the present invention. Pig handler 42 is comprised of a flat cylindrical body 148 connected to flow line 41 from manifold 40 and an outlet to flow line 20. Also connected to body 148 is a pig supply magazine 120 in which a supply of pigs 130 is carried. Also connected to body 148 is a pig discharge carrier 122. As with the design of FIG. 6, the pig supply magazine 120 and pig discharge carrier 122 may be serviced by ROVs, thereby permitting a supply of clean pigs 130. Ball valve body 150 has a passageway 152 there through. It further includes a single stop bar (not shown) in passageway 152. A pig (not shown) is situated with stop bar down stream of the pig, thereby preventing it from entering the heat exchanger 44. On launching the pig, the ball valve body is rotated 180° such that the stop bar is now upstream of the pig, thereby permitting it to enter the heat exchanger 44. While the pig is in the heat exchanger 44, the valve body 150 is again rotated 180°, thus when the pig re-enters the valve body 150 the stop bar is in a position to receive and retain the pig.

Figure 11:
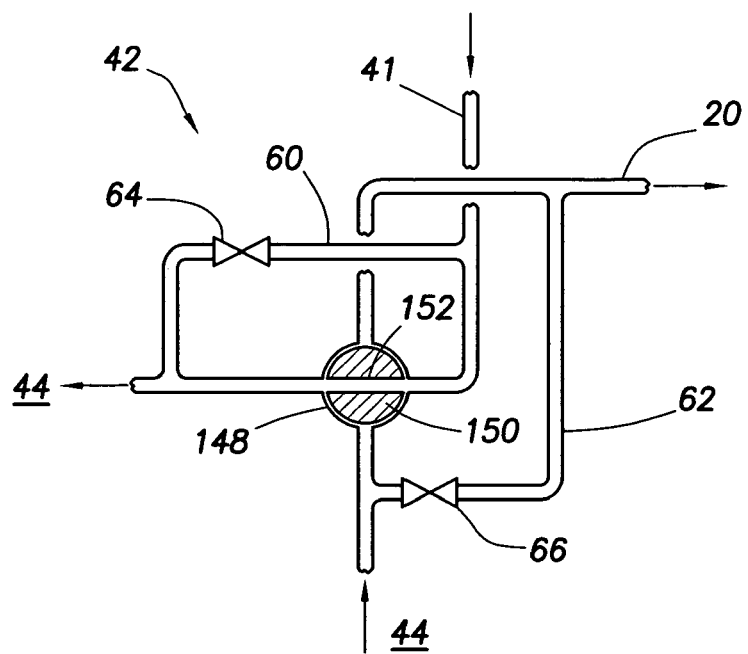
FIG. 11 is a flow path drawing of the ball type pig handler of FIG. 10.

The pig handler 42 of FIG. 10 is further depicted in FIG. 11, as including optional by-pass lines 60 and 62, with controllable flow valves 64 and 66, respectively. This permits bypass of the pig handling 42 system and/or pressure regulation. As noted above, a single bypass conduit is all that is actually required due to the compressible nature of the hydrocarbon in the heat exchanger 44. An alternative method of controlling flow would simply be to install a reduced diameter bypass to direct most of the flow to the body 148. While FIG. 10 shows a single passageway 152, it will be appreciated that additional radial ports that do not connect with flow path may be installed in the body to receive clean pigs from the pig supply magazine 120 and to discharge used pigs into pig discharge carrier 122 by means of mechanical or fluid assist.

Figure 12:
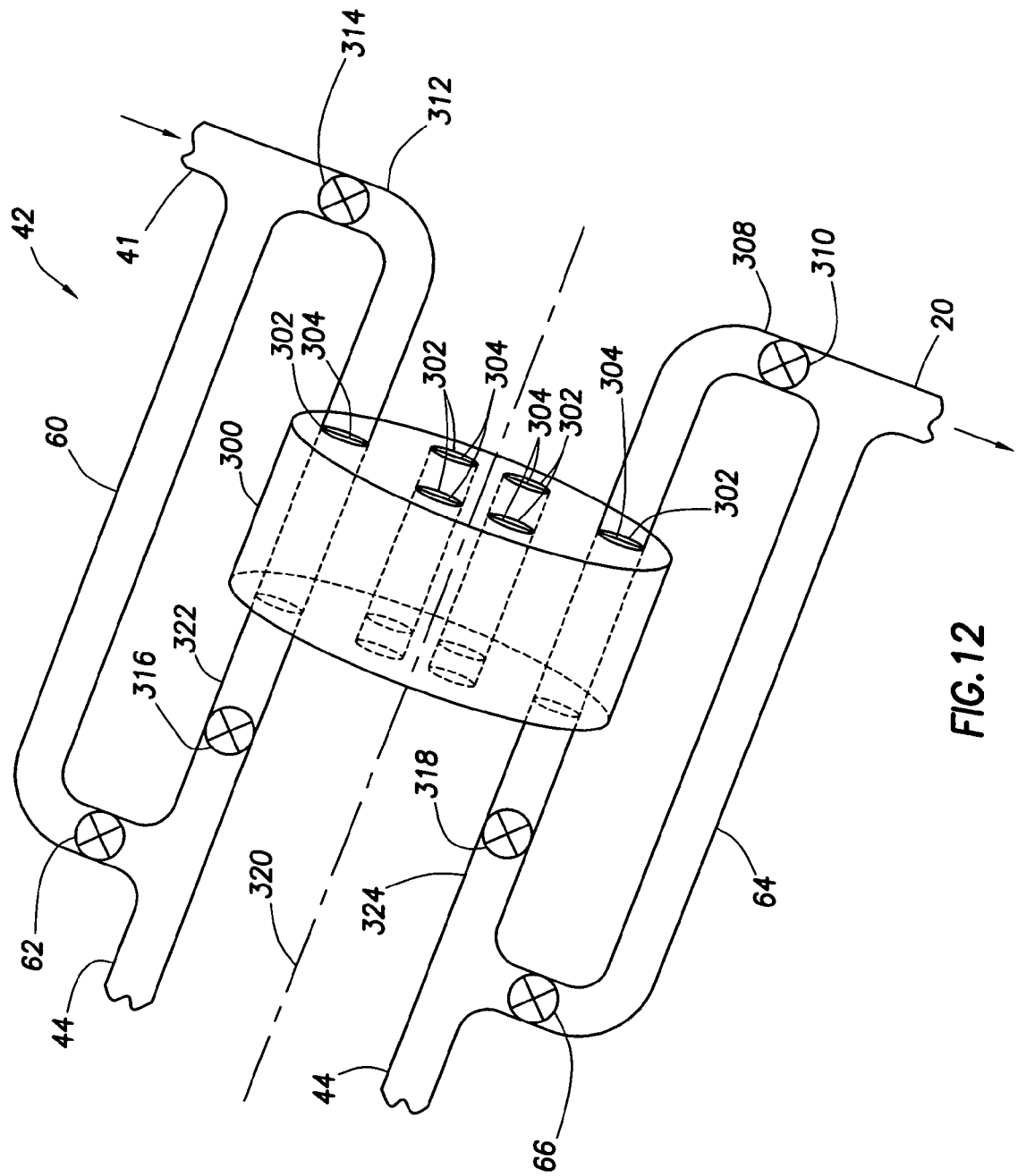
FIG. 12 is a phantom view of a revolver type pig handler.

Yet another embodiment of the pig handler used within the present invention is shown in FIG. 12, which is a revolver design having additional pressure isolation. A revolver body 300 is housed within a sealed outer body (not shown). The revolver body 300 has multiple passageways 302, each passageway 302 having a stop bar 304. A fluid path 312 from the flow line 41 to a passageway 302 is provided for with the ability to isolate the passageway by means of control valve 314. The revolver body 300 is further isolated from the heat exchanger 44 by means of a second isolation valve 316 in line 322. A return line 324 is provided for from the cold side of heat exchanger 44 and is in fluid communication with pipeline 20 through passageway 302 and return line 308. Pressure isolation valves 318 in line 324 and 310 in line 308 may be closed to effectively isolate the revolver body 300 from the production flow. This design permits retrieval and repair or replacement of the revolver system. A bypass line 60, including control valve 62 is provided between the flow line 41 and the hot side of heat exchanger 44. A similar bypass arrangement 64 and valve 66 is provided between the cold side of heat exchanger 44 and the pipeline. It will be appreciated that revolver bodies 342 and 344 may be housed in separate outer bodies. Further, the system may be minimized such that bodies 342 and 344 are each provided with a single passageway In operation, a pig (not shown) is loaded into an empty passageway 302 not in the fluid flow path with heat exchanger 44 from a pig supply magazine (not shown) using a mechanical or fluid assist. The pig abuts against stop bar 304. The revolver body 300 rotates about axis 320 to bring the pig into the flow path. One advantage to the pig handler 42 of FIG. 12 is that it is not necessary to maintain a rotating pressure seal between the inlet pipe 312, revolver body 300 and outlet pipe 322 when the passageway 302 containing the pig is brought into the launch position, i.e., in flow communications between flow line 41, inlet 312, passageway 302, outlet 322 and heat exchanger 44. The design permits closing of valves 314 and 316, while opening valve 62. Once the pig is in the launch position, valves 314 and 316 are reopened and valve 62 is closed. The pig recovery is similar with the pig being received in a passageway 302 that is aligned in the flow path from the cold side of heat exchanger 44, through inlet 324, through passageway 302, through outlet 308 and into pipeline 20. Valve 66 is opened and valves 318 and 310 are closed when the revolver body 300 is rotated to discharge the pig into a pig receiving magazine (not shown). Alternatively, the primary flow path can be through bypasses 60 and 64, with the revolver body 300 being placed in flow communications with the heat exchanger 44 only during pigging operations.

It will be appreciated that the pig handler of FIG. 12 may be further reduced to revolver body 300 having a minimum two passageways 302 and having communication with a single pig storage magazine (not shown). Pig 130 is loaded into one of the passageways 302 and both passageways 302 are not in fluid communication with the hydrocarbon stream. A single inlet bypass 60 having a restricted flow or a selectively controlled valve is provided to ensure continued flow into the heat exchanger while a pig 130 is being loaded or unloaded. The compressible nature of the hydrocarbon flow provides for continued operation. The revolver body 300 is then rotated to place the pig 130 bearing passageway 302 in fluid communication with the hydrocarbon production flow from the subsea well 40, launching the pig into the heat exchanger 44. The pig 130 is received and stopped in the passageway 302 and stopped by the stop bar in fluid communications with the outlet of the heat exchanger and the proximate end of the pipeline. The revolver body 300 is then rotated to the parking position and the pig 130 ejected into the storage magazine. The revolver body 300 is again rotated to place both passageways in communication with the hydrocarbon flow.

The pig launcher 42 of FIG. 12 may also be simplified to a degree by eliminating inlet 312 and valve 314. The motive force for placing the pig in the flow stream (through outlet 322 and valve 316) could be provided by fluid or mechanical means acting on the passageway 302 one aligned on the flow path.

Figure 13:
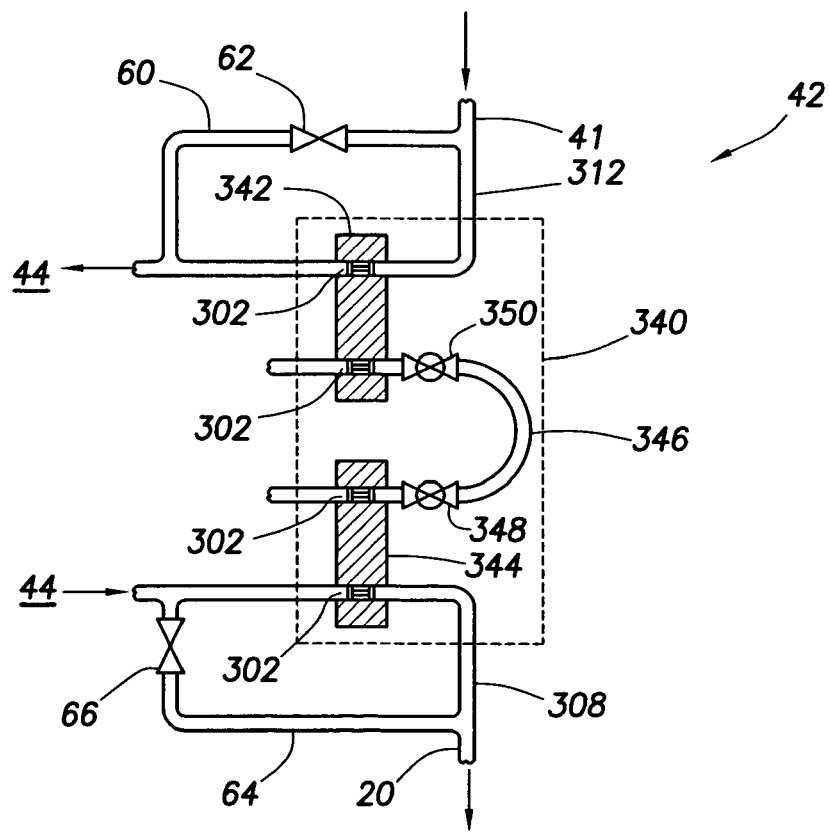
FIG. 13 is a flow path drawing of a dual revolver pig handler.

Another revolver type system is depicted in FIG. 13. Herein, dual revolver bodies 342, 344 are mounted in a body 340. Revolver bodies 342 and 344 may be optionally provided with pig supply magazines and pig discharge magazines, respectively. Unlike the pig launcher 42 of FIG. 12, the present pig launcher 42 requires a seal mechanism between inlet 312, revolver body 342 and outlet 322 to seal fluid flow when the revolver body 342 is rotating. A similar seal mechanism would likewise be provided for flow path between inlet 324, revolver body 340, and outlet 308. As with other pig launcher systems, the pig launcher 42 of FIG. 13 includes launching bypass 60 with control valve 62 and receiving bypass 64 with control valve 66. An interconnection tube 346 is provided for between revolvers 342 and 344, with isolation valves 348 and 350 in the flow path. Thus, a pig 130 may be shuttled from the receiving revolver 344 to the launching revolver 342 by fluid or mechanical means through valve 348, interconnection tube 346 and valve 350 by fluid or mechanical means. Positioning the pig 130 in revolver body 342 will clean wax and other solids from the pig 130 by means of heat transferred from the production stream through the revolver body 342.

A reduced version of the dual revolver system of FIG. 13 may also be employed, wherein revolver bodies 342 and 344 are each provided with at least one passageway 302, a launching bypass 60 and a one or more pig 130 storage magazines (not shown) in communication with either or both revolver bodies 342 and 344. A pig 130 may be loaded into revolver body 344 by means of kicker fluid or other mechanical means. During this period, the passageway 302 is not in fluid communication with the hydrocarbon production flow. Hydrocarbon production flow continues to enter the heat exchanger 44 through bypass 60, where it is compressed as hydrocarbon production flow to pipeline 20 is interrupted. Revolver body 342 is rotated such that both revolver bodies 342 and 344 are in fluid communication with interconnection tube 346. Valves 348 and 350 are opened and the pig transferred to revolver body 342 passageway 302. During this operation, hydrocarbon flow enters into the heat exchanger 44 through bypass conduit 60. Conduit 60 may be further simplified by removing valve 62 and providing a restricted flow by reduced diameter or other suitable means. Revolver bodies 342 and 344 are then rotated to place their respective passageways 302 in fluid communications with the hydrocarbon flow, launching pig 130 into the heat exchanger 44. Upon completion of its transit of heat exchanger 44, the pig 130 is captured in revolver body 344 passageway 302. Revolver body 344 is then rotated to be in communication with the pig storage magazine where it is discharged by means described in reference to FIG. 9. Revolver body 344 is then rotated to place its passageway 302 into fluid communication with the hydrocarbon flow. It should be noted that a similar process is followed if the pig storage magazine is in communication with revolver body 342.

Figure 14:
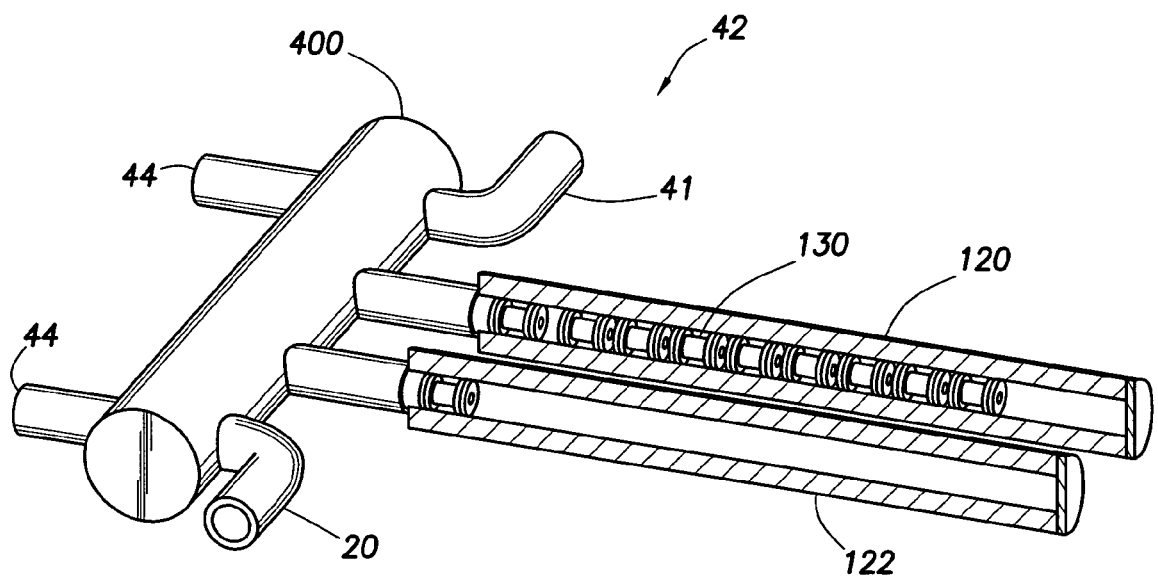
FIG. 14 is an external view of a sliding block pig handler.
Figure 15:
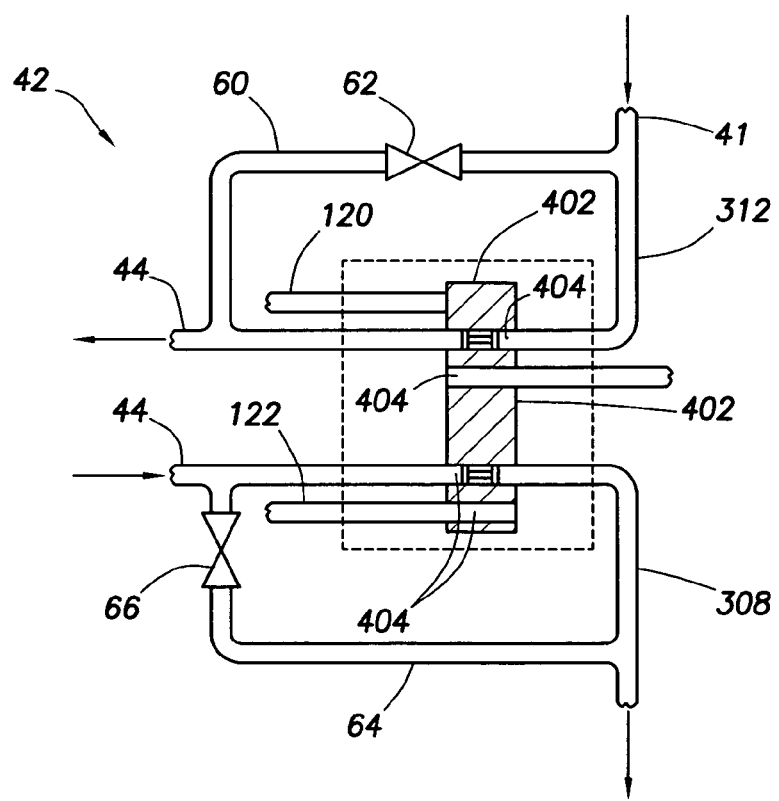
FIG. 15 is a flow path drawing of a sliding block pig handler.

An alternative to the revolver type of pig launcher is depicted in FIGS. 14 and 15. What is depicted is a slider block pig handler 42. FIG. 14 is a simplified external view of a slider block having at least one passageway. It is comprised of body 400 having an internal sliding valve block 402 (FIG. 15). The sliding valve block 402 is sealed internally within body 400, such that when the block 402 changes position within body 400, the fluid flow from inlet 312 is interrupted. The sliding valve block 402 may be moved within body 400 by suitable hydraulic, electrical or mechanical means (not shown). The body 400 of FIG. 14 is depicted as circular in cross section. However, the body 400 and corresponding sliding block valve 402 may have other cross-sectional shapes. FIG. 14 depicts the body having a replaceable pig supply magazine 120 and pig discharge tube 122 for supplying new and storing used pigs 130. The body is further connected to heat exchanger 44. The pig launcher 42 of FIG. 14 is shown in greater detail in FIG. 15. The body 400 has within in a sliding valve block 402 having at least on passageway 404 therein. Each of the passageways 404 has a stop bar (not shown therein). As depicted in FIG. 15, the production flow from 41 is intended to flow into inlet 312, through passageway 404 and into the hot side of heat exchanger 44. There also exists a launching bypass 60 with a flow control valve 62 therein. Similarly, the production from the cold side of the heat exchanger 44 enters valve block 402, passes through passageway 404, through outlet 308 and into pipeline 20. In the block 402 of FIG. 15, depicts two launch chambers adjacent to each other and two receiving chambers adjacent to each other. The process starts with the upper launch passageway 404 being positioned such that it is in communication with the pig supply magazine 120. A pig 130 is advanced into the passageway 404 by mechanical or hydraulic means until it comes into contact with the stop bar in passageway 404. During this period, the upper portion of the receiving passageway 404 is in fluid communication with the cold side of heat exchanger 44 and outlet 308. The sliding valve block 402 is translated until the passageway 404 bearing pig 130 is in fluid communication with inlet 312 and the hot side of heat exchanger 44, thereby launching pig 130. As noted previously, the bypasses 60 and 64 may be opened by opening valves 62 and 66, respectively, to prevent pressure spikes within the system as the valve block 402 is being moved from open to closed positions. The valve block 402 is then translated until the lower of the receiving passageway 404 is in fluid communication with the cold side of heat exchanger 44 and outlet 308. The pig 130 completes its traverse through the heat exchanger 44 and is received in the lower of the receiving passageways 404, where it comes into contact with the passageway 404 stop bar. The sliding block 402 is then translated until the lower receiving passageway 404 is aligned with the pig disposal tube 122. In doing so, the empty upper launching passageway and upper receiving fluid passageway 404 are in fluid communication with the heat exchanger 44. The dirty pig 130 may then be ejected into the pig disposal tube 122 by suitable mechanical or fluid means. Thus, the pig handler 42 of FIGS. 14 and 15, provide for a simple means of loading, launching, receiving and disposing of pigs 130 used within the present invention.

The pig launcher of FIGS. 14 and 15 may be simplified by providing for a single passageway 404 in block 402, a single inlet bypass 60 and at least one pig storage magazine 120 or 122. During normal operations, the passageway 404 is in fluid communications with the heat exchanger 44 outlet and pipeline 20 proximate end and the hydrocarbon production flow enters the heat exchanger 44 through bypass 60. During pigging operations, the block 402 is translated to magazine 120 or 122 and a pig 130 is loaded into passageway 404. During this period the fluid compresses in heat exchanger 44. The block 402 then translates to come into fluid communication with the hydrocarbon flow through inlet 312, launching pig 130 into the heat exchanger. The block 402 is then translated to place passageway 404 in fluid communication with the heat exchanger 44 outlet. The pig 130 is captured in passageway 404 and the block 402 is translated to magazine 120 or 122 to discharge the pig. The block 402 is then translated back to place passageway 404 in fluid communication with the heat exchanger 44 outlet.

One variation that may be used within the context of the present invention is for the pig handler to launch the pig through the heat exchanger and recover it at the terminus, whether that is on an offshore platform or onshore. This would eliminate the need for a receiving section or a receiving bypass capability. Yet another variation would provide for an additional receiving passageway not having stop bar therein (a "pass through chamber"). It will be appreciated that such additional chambers may be designed into the pig handlers disclosed above. This would permit an operator to launch a pig and index or translate the receiving section such that the pass through passageway is in fluid communications with the cold side of heat exchanger 44 and outlet 308. The pig would then travel the pipeline only when the operator allowed it to do so. Further it will be appreciated that while the above embodiments have been in the context of a bare pipe, open-loop heat exchanger, the above embodiments may just as easily be practiced utilizing a counter flow jacket cooling system for heat exchange or a configuration other than an open loop.

While the present invention has been described in terms of various embodiments, modifications in the apparatus and techniques described herein may be made without departing from the concept of the present invention. It should be understood that the embodiments and techniques described in the foregoing are illustrative and are not intended to limit the scope of the invention.

The invention claimed is:

1. A system for maintaining production flow in a subsea pipeline having a proximate and a distal end, the pipeline being in fluid communication with a host on a distal end, the system comprising:
   a pig handler, having an inlet system in fluid communication with at least one subsea well adapted to receive a hydrocarbon production flow, and an outlet system in fluid communication with the proximate end of the pipeline;
   a subsea heat exchanger, the heat exchanger having an inlet in fluid communication with the pig handler inlet system and an outlet in fluid communication with the pig handler outlet system, adapted so that the temperature of the hydrocarbon production flow may be reduced sufficiently to cause solids to form;
   a pig launching system, adapted so that a pig may be selectively placed into the hydrocarbon production flow through the pig handler inlet system, launching the pig into the heat exchanger to remove deposited solids from the heat exchanger; and
   a pig receiving system, adapted so that a pig may be removed from the hydrocarbon production flow through the pig handler outlet system prior to production flow entry into the subsea pipeline;
   wherein the heat exchanger is a forced coolant pipe-in-pipe system, having inner and outer pipes, adapted so that production flows through the inner pipe and coolant flows through the annulus formed between the inner and outer pipes in a direction counter to the production flow direction.

2. The system of claim 1, further comprising a pig handler indexing apparatus, adapted so that a pig that has entered into the pig receiving system may be positioned into the pig launching system for reuse.

3. The system of claim 1, wherein the pig handler comprises:
   an outer, waterproof sealed housing;
   an inner body, having at least two passageways therethrough that can be indexed to provide a fluid path in sealed fluid communication with the pig handler inlet system and the heat exchanger inlet, a fluid path in sealed fluid communication with the heat exchanger outlet and the pig handler outlet system;
   a pig storage position connected to the housing;
   apparatus for loading a pig into a passageway from the pig storage position and for discharging a pig from a passageway into the pig storage position; and
   apparatus for indexing the inner body within the outer housing to launch a pig stored in a passageway by bringing it into fluid communication with the hydrocarbon production flow or indexing the inner body to bring a passageway into fluid communications with the pig storage position.

4. The system of claim 1, wherein the pig launching system and the pig receiving system are thermally isolated.

5. The system of claim 3, wherein the pig storage position further comprises
   a pig supply magazine for storage of pigs and a pig discharge magazine for storage of used pigs;
   apparatus to selectively advance a pig from the supply magazine into an inner body passageway; and
   apparatus to selectively advance a used pig into the discharge magazine from an inner body passageway.

6. The system of claim 1, wherein at least one of said pig handler, pig launching system, and pig receiving system are retrievable.

7. The system of claim 5, wherein the apparatus to selectively advance the pigs is comprised of a hydraulic or mechanical system.

8. The system of claim 1, further including a bypass fluid conduit between the subsea well and the heat exchanger inlet.

9. The system of claim 1, further including a bypass fluid conduit between the outlet of the heat exchanger and the proximate end of the pipeline.

10. The system of claim 8, wherein the production flow through the bypass may be selectively controlled.

11. The system of claim 1, wherein the heat exchanger is a pipe in the subsea environment.

12. The system of claim 1, wherein the coolant is seawater.

13. The system of claim 1, further including a pump to force the coolant through the annulus.

14. The system of claim 1, further comprising a subsea manifold in fluid communication with multiple subsea wells and the pig handler.

15. The system of claim 1, wherein the pig handler further comprises:
   a sealed outer housing having inlets in fluid communication with the subsea well and the heat exchanger outlet and outlets in fluid communication with the heat exchanger inlet and the proximate end of the pipeline;
   a sealing inner body within the outer housing, the inner body having at least one passageway therethrough, having a stop at one end of the passageway, the passageway adapted to receive a pig, wherein
   the inner body adapted to be indexed to place the stop proximate to the outer body inlet in fluid communication with the subsea well, the passageway bearing a pig being in fluid communications with the subsea well and the heat exchanger inlet, the hydrocarbon production flow launching the pig in the passageway into the heat exchanger; and
   the inner body adapted to be indexed to place the stop proximate to the pig handler outlet to the proximate end of the pipeline, the passageway being in fluid communications with the heat exchanger outlet and the pipeline, the stop thereby capturing the pig.

16. The system of claim 1, wherein the pig handler further comprises:
   a pig magazine and a pig discharge magazine; and
   apparatus for loading a pig from said pig supply magazine into a passageway and discharging a pig from a passageway into the pig discharge magazine.

17. The system of claim 1, further comprising:
   at least two indexing bodies, each within an outer sealed housing and having at least one passageway therethrough, one of the housings being connected to at least one subsea well and the heat exchanger inlet, the other housing being connected to the heat exchanger outlet and the pipeline proximate end.

18. The system of claim 17, wherein the bodies have at least two passageways therethrough.

19. The system of claim 17, wherein said at least two indexing bodies are contained within a single housing, the single housing having an inlet in fluid communication with the at least one subsea well and an outlet in fluid communication with the heat exchanger inlet, and further having an inlet in fluid communications with the heat exchanger outlet and an outlet in fluid communication with the pipeline proximate end.

20. The system of claim 1, the pig handler further comprising:
   a housing; and
   a translatable body within the housing, the body adapted to receive a pig and launch the pig by establishing a fluid path between the subsea well and the heat exchanger inlet or receive the pig by establishing a fluid path between the heat exchanger outlet and the pipeline proximate end.

21. A method for maintaining production flow in a subsea pipeline, comprising:
   producing a hydrocarbon from at least one subsea well;
   transporting the hydrocarbon from the at least one subsea well to a heat exchanger;
   passing the hydrocarbon through the heat exchanger, in order to cool the hydrocarbon and precipitate at least one solid selected from waxes, paraffins, asphaltenes, and/or hydrates;
   passing the hydrocarbon through a pipeline from the heat exchanger to a host; and
   pigging the heat exchanger with a pig to produce a slurry of the solids in the hydrocarbon;
   wherein passing the hydrocarbon through the heat exchanger comprises passing the hydrocarbon through an inner pipe in a first direction and passing seawater coolant through an annulus surrounding the inner pipe in a second direction, the second direction opposite the first direction.

22. The method of claim 21, wherein the temperature of the hydrocarbon is lowered by at least 20 degrees centigrade from an inlet to an outlet of the heat exchanger.

23. The method of claim 21, further comprising:
   recovering a pig from an outlet of the heat exchanger; and
   recycling the pig to an inlet of the heat exchanger.

* * * * *